US011989924B2

(12) United States Patent
Namiki

(10) Patent No.: US 11,989,924 B2
(45) Date of Patent: May 21, 2024

(54) IMAGE RECOGNITION SYSTEM, IMAGE RECOGNITION APPARATUS, IMAGE RECOGNITION METHOD, AND COMPUTER READABLE MEDIUM

(71) Applicant: NEC Corporation, Tokyo (JP)

(72) Inventor: Shigeaki Namiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 392 days.

(21) Appl. No.: 17/609,836

(22) PCT Filed: May 22, 2019

(86) PCT No.: PCT/JP2019/020310
§ 371 (c)(1),
(2) Date: Nov. 9, 2021

(87) PCT Pub. No.: WO2020/235059
PCT Pub. Date: Nov. 26, 2020

(65) Prior Publication Data
US 2022/0222916 A1    Jul. 14, 2022

(51) Int. Cl.
*G06K 9/00* (2022.01)
*G06T 5/50* (2006.01)
*G06V 10/72* (2022.01)
*G06V 10/772* (2022.01)

(52) U.S. Cl.
CPC .............. *G06V 10/72* (2022.01); *G06T 5/50* (2013.01); *G06V 10/772* (2022.01); *G06T 2207/20081* (2013.01); *G06T 2207/20084* (2013.01)

(58) Field of Classification Search
CPC ........ G06V 10/72; G06V 10/772; G06T 5/50; G06T 2207/20081; G06T 2207/20084

USPC .......................................................... 382/103
See application file for complete search history.

(56) References Cited

FOREIGN PATENT DOCUMENTS

JP    2004-191112 A    7/2004
JP    2019-003396 A    1/2019

OTHER PUBLICATIONS

Wang, Yingying, et al. "The influence of the activation function in a convolution neural network model of facial expression recognition." Applied Sciences 10.5 (2020): 1897. (Year: 2020).*

(Continued)

*Primary Examiner* — Jonathan S Lee
(74) *Attorney, Agent, or Firm* — Sughrue Mion, PLLC

(57) ABSTRACT

A system includes: a unit that input a series image sequence; a unit that selects a reference image; a unit that selects a proximity image; and an inference unit that recognizes the reference image and the proximity image by performing inference processing, including convolution processing and activation function processing, on the reference image and the proximity image. The inference unit generates results of performing the convolution processing and the activation function processing on the proximity image from the results of the convolution processing and the activation function processing performed on the reference image, and the results of the product of the results of the convolution processing performed on a difference image, which is an image of the difference between the reference image and the proximity image, and a derivative value of the results of the convolution processing and the activation function processing performed on the reference image.

8 Claims, 18 Drawing Sheets

(56) References Cited

OTHER PUBLICATIONS

Agyepong, Jonas T., et al. "Secure image inference using pairwise activation functions." IEEE Access 9 (2021): 118271-118290. (Year: 2021).*
Nanni, Loris, et al. "Stochastic activation function layers for convolutional neural networks." (2020). (Year: 2020).*
International Search Report for PCT Application No. PCT/JP2019/020310, dated Aug. 13, 2019.
Geoffrey Hinton, Oriol Vinyals, and Jeff Dean. "Distilling the knowledge in a neural network", arXiv preprint arXiv:1503.02531v1 (Mar. 9, 2015).

* cited by examiner

SUM-OF-PRODUCT OPERATION
WHILE SLIDING
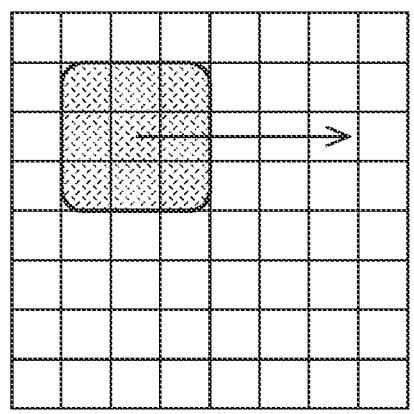 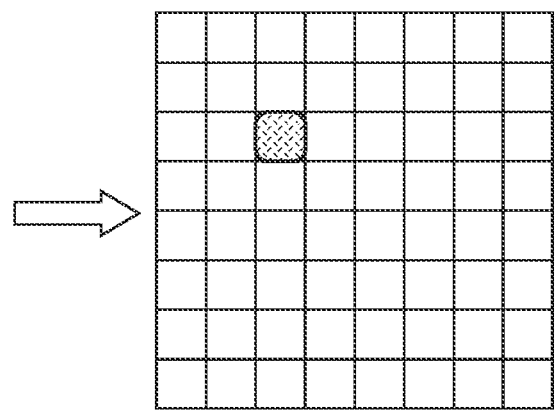
ORIGINAL IMAGE          IMAGE AFTER CONVERSION
Fig. 2

$$A \begin{Bmatrix} X_{i-1,j-1} & X_{i-1,j} & X_{i-1,j+1} \\ X_{i,j-1} & X_{i,j} & X_{i,j+1} \\ X_{i+1,j-1} & X_{i+1,j} & X_{i+1,j+1} \end{Bmatrix} \times \begin{bmatrix} W_{p-1,q-1} & W_{p-1,q} & W_{p-1,q+1} \\ W_{p,q-1} & W_{p,q} & W_{p,q+1} \\ W_{p+1,q-1} & W_{p+1,q} & W_{p+1,q+1} \end{bmatrix}$$

$$+ A' \times \begin{Bmatrix} \Delta X_{i-1,j-1} & \Delta X_{i-1,j} & \Delta X_{i-1,j+1} \\ \Delta X_{i,j-1} & \Delta X_{i,j} & \Delta X_{i,j+1} \\ \Delta X_{i+1,j-1} & \Delta X_{i+1,j} & \Delta X_{i+1,j+1} \end{Bmatrix} \times \begin{bmatrix} W_{p-1,q-1} & W_{p-1,q} & W_{p-1,q+1} \\ W_{p,q-1} & W_{p,q} & W_{p,q+1} \\ W_{p+1,q-1} & W_{p+1,q} & W_{p+1,q+1} \end{bmatrix} = Y_{i,j}$$

$$f(x)$$
$$+$$
$$f'(x) \times \Delta x$$

$$A(x * w)$$
$$+$$
$$A' \times (\Delta x * w)$$

\* DENOTES CONVOLUTION

Fig. 8

IMAGE RECOGNITION SYSTEM, IMAGE RECOGNITION APPARATUS, IMAGE RECOGNITION METHOD, AND COMPUTER READABLE MEDIUM

This application is a National Stage Entry of PCT/JP2019/020310 filed on May 22, 2019, the contents of all of which are incorporated herein by reference, in their entirety.

TECHNICAL FIELD

The present disclosure relates to an image recognition system, an image recognition apparatus, an image recognition method, and a computer readable medium.

BACKGROUND ART

A number of methods using deep learning have been proposed in the field of image processing such as image recognition. By using deep learning, it has become possible to recognize a person or an object with a high accuracy from an image of the person or the object. However, in general, these methods that use deep learning require a large amount of computation since the scale of the model (the network structure used in deep learning) is large. Therefore, when a series image sequence such as a time-series continuous image sequence (time series) continuously captured by a high-speed camera or the like or a multi-spectral image sequence (series in a frequency direction) is used as an input, an extremely large computational load is required.

In order to solve the aforementioned problem, Non-Patent Literature 1 discloses a method of generating, from a highly accurate model that has already been trained (hereinafter this model may be referred to as a teacher model), called distillation learning, a model with a smaller computational load (hereinafter this model may be referred to as a student model). Specifically, Non-Patent Literature 1 discloses a method of obtaining a student model whose accuracy is close to that of a teacher model while succeeding with quick convergence using information indicating how learning data is generalized (hereinafter this information may be referred to as privileged information) and causing the student model to learn the learning data using the privileged information as a clue.

CITATION LIST

Non Patent Literature

[Non Patent Literature 1] Geoffrey Hinton, Oriol Vinyals, and Jeff Dean. "Distilling the knowledge in a neural network", arXiv preprint arXiv:1503.02531v1 (9 Mar. 2015)

SUMMARY OF INVENTION

Technical Problem

However, when a series image sequence such as a time-series continuous image sequence, a multi-spectral image sequence or the like is used as the input, according to the method disclosed in Non-Patent Literature 1, it is necessary to apply a student model to all the images that form the series image sequence and perform inference, which causes a problem that the amount of redundant calculations is large and the computational load is large.

In view of the above discussion, the aim of the present disclosure is to solve the aforementioned problem and provide an image recognition system, an image recognition apparatus, an image recognition method, and a computer readable medium capable of performing image recognition on the series image sequence having sequentiality with less computational load.

Solution to Problem

An image recognition system according to one aspect includes:
  a series image sequence input unit configured to input a series image sequence having sequentiality;
  a reference image selection unit configured to select a reference image from the series image sequence;
  a proximity image selection unit configured to select a proximity image that is close to the reference image from the series image sequence; and
  an inference unit configured to recognize the reference image and the proximity image by performing inference processing on the reference image and the proximity image, the inference processing including convolution processing and activation function processing for outputting a constant value with respect to an input value within a predetermined region, in which
  the inference unit generates results of performing the convolution processing and the activation function processing on the proximity image from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

An image recognition apparatus according to one aspect includes:
  a series image sequence input unit configured to input a series image sequence having sequentiality;
  a reference image selection unit configured to select a reference image from the series image sequence;
  a proximity image selection unit configured to select a proximity image that is close to the reference image from the series image sequence; and
  an inference unit configured to recognize the reference image and the proximity image by performing inference processing on the reference image and the proximity image, the inference processing including convolution processing and activation function processing for outputting a constant value with respect to an input value within a predetermined region, in which
  the inference unit generates results of performing the convolution processing and the activation function processing on the proximity image from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

An image recognition method according to one aspect includes:
- a step of inputting a series image sequence having sequentiality;
- a step of selecting a reference image from the series image sequence;
- a step of selecting a proximity image that is close to the reference image from the series image sequence; and
- an inference step of recognizing the reference image and the proximity image by performing inference processing on the reference image and the proximity image, the inference processing including convolution processing and activation function processing for outputting a constant value with respect to an input value within a predetermined region, in which
- in the inference step, results of performing the convolution processing and the activation function processing on the proximity image are generated from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

A computer readable medium according to one aspect causes a computer to execute:
- a procedure for inputting a series image sequence having sequentiality;
- a procedure for selecting a reference image from the series image sequence;
- a procedure for selecting a proximity image that is close to the reference image from the series image sequence; and
- an inference procedure for recognizing the reference image and the proximity image by performing inference processing on the reference image and the proximity image, the inference processing including convolution processing and activation function processing for outputting a constant value with respect to an input value within a predetermined region, in which
- in the inference procedure, results of performing the convolution processing and the activation function processing on the proximity image are generated from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

Advantageous Effects of Invention

According to the aforementioned aspects, it is possible to obtain effects that an image recognition system, an image recognition apparatus, an image recognition method, and a computer readable medium capable of performing image recognition on a series image sequence having sequentiality with less computational load can be performed.

BRIEF DESCRIPTION OF DRAWINGS

FIG. 2 is a diagram for describing an outline of convolution processing;

FIG. 8 is a diagram showing an example of correspondence between a mathematical expression that expresses the convolution processing according to each example embodiment, and data of the convolution processing shown in FIG. 7;

DESCRIPTION OF EMBODIMENTS

Hereinafter, with reference to the drawings, example embodiments of the present disclosure will be described. For the sake of clarification of the descriptions, the following description and the drawings are omitted and simplified as appropriate. Further, throughout the drawings, the same components are denoted by the same reference symbols and overlapping descriptions will be omitted as necessary.

<Inference Processing (Image Recognition Processing) Using Convolutional Neural Network>

Prior to giving the description of each example embodiment according to the present disclosure, an outline of the present disclosure will be given.

In each example embodiment, inference processing (image recognition processing) is performed using a convolutional neural network (CNN).

Figure 1:
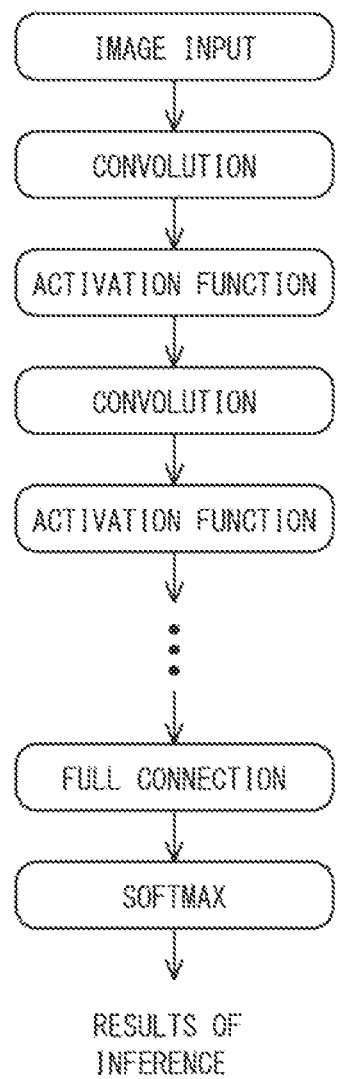
FIG. 1 is a diagram for describing an outline of inference processing (image recognition processing) that uses a convolutional neural network.

Referring first to FIG. 1, general inference processing (image recognition processing) using a convolutional neural network will be described.

As shown in FIG. 1, in inference processing (image recognition processing) that uses a convolutional neural network, convolution processing and activation function processing are performed on an input original image a plurality of times, and then full connection processing and softmax processing are performed on the obtained image, whereby results of inference (results of image recognition) are output.

Figure 3:
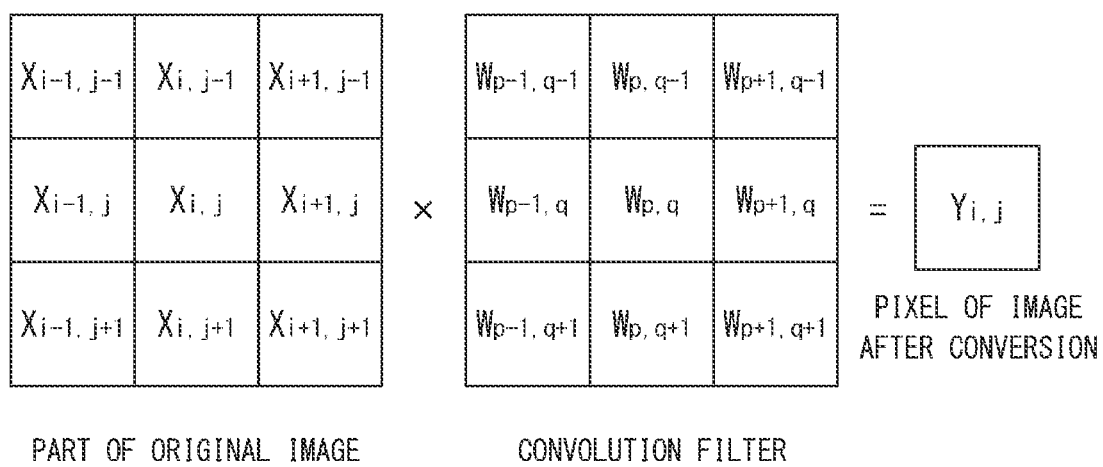
FIG. 3 is a diagram for describing an outline of a sum-of-product operation.

In the convolution processing, as shown in FIG. 2, a part of an original image is sequentially selected while it is slid, and the sum-of-product operation with a convolution filter is performed on a part of the selected original image. FIG. 3 shows an outline of the sum-of-product operation. In FIG. 3, the subscript t indicating time is omitted. The sum-of-product operation value of a pixel in the transformed image obtained by transforming the original image is obtained each time the sum-of-product operation is performed. Finally, a set of logical operation values (positive and negative decimals) for each pixel of the converted image is output as results of the convolution processing.

Figure 4:
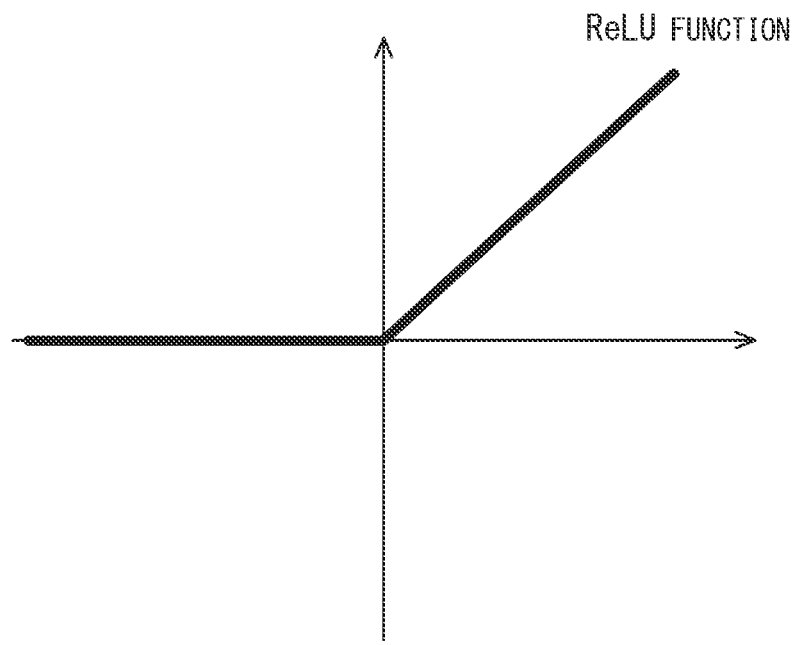
FIG. 4 is a diagram for describing an outline of activation function processing.

In the activation function processing, the results of the convolution processing are input, and a constant value is output with respect to input values within a predetermined region. The activation function is, for example, a Rectified Linear Unit (ReLU) function, a Sigmoid function, a Tangent Hyperbolic (Tan h) function (a hyperbolic tangent function) or the like. When, for example, the activation function is an ReLU function, as shown in FIG. 4, in the activation function processing, a constant value 0 is output with respect to a negative input value and the input value is directly output with respect to a positive input value.

<Outline of Each Example Embodiment>

Next, an outline of each example embodiment will be described.

(1) Convolution Processing (1-1) First Feature of Convolution Processing

First, a first feature of the convolution processing according to each example embodiment will be described.

When a series image sequence such as a time-series continuous image sequence, a multi-spectral image sequence or the like is input, the aforementioned inference processing (image recognition processing) is sequentially performed on a plurality of images that form the series image sequence. When, for example, an image that serves as a reference in the series image sequence is referred to as a reference image and an image that is close to the reference image is referred to as a proximity image, first, the aforementioned inference processing (image recognition processing) is performed on the reference image and then the aforementioned inference processing (image recognition processing) is performed on the proximity image. In the following, inference processing (image recognition processing) the same as that described above is performed on the next proximity image as well.

At this time, in the series image sequence, the assumption that the amount of change between the reference image and a proximity image that is close to the reference image is small is established. Under this assumption, the amount of change of the results of the convolution processing performed on the reference image and the proximity image becomes small as well.

Therefore, with regard to the proximity image as well, like in the reference image, execution of the convolution processing causes a problem that the amount of redundant calculations increases, which causes the computational load to increase.

In order to solve the aforementioned problem, in the convolution processing and the activation function processing according to each example embodiment, the proximity image is treated as an image obtained by adding a reference image and a difference image, which is an image of the difference between the reference image and the proximity image. Then, results of performing the convolution processing and the activation function processing on the proximity image are approximated to the results of the convolution processing and the activation function processing performed on the reference image, and the product of the derivative value of the results of the convolution processing and the activation function processing performed on the reference image and the results of the convolution processing performed on the difference image. Then, by adding the results of the convolution processing and the activation function processing performed on the reference image and the results of the product of the derivative value of the results of the convolution processing and the activation function processing performed on the reference image and the results of the convolution processing performed on the difference image, results of performing the convolution processing and the activation function processing on the proximity image are generated. The first-order Taylor approximation is, for example, used for this approximation. In this manner, in the convolution processing and the activation function processing performed on the proximity image, results of the convolution processing and the activation function processing performed on the reference image may be used, and only the calculation of the product of the derivative value of the results of the convolution processing and the activation function processing performed on the reference image and the results of the convolution processing performed on the difference image may be performed. Accordingly, redundant calculations are reduced, whereby it is possible to perform inference processing (image recognition processing) with less computational load.

Figure 5:
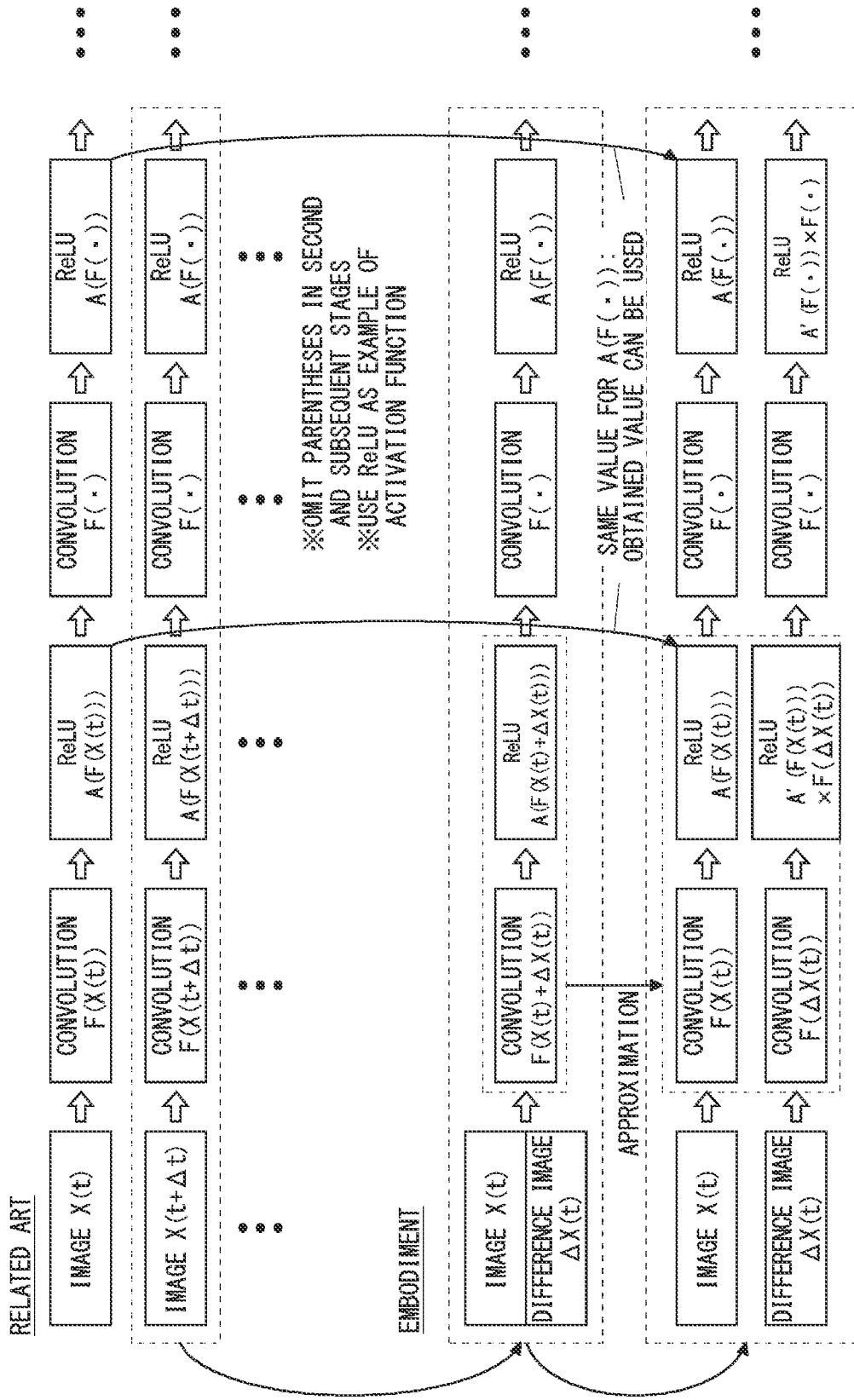
FIG. 5 is a diagram for describing an outline of convolution processing according to each example embodiment.

Referring next to FIG. 5, the convolution processing according to each example embodiment as compared to that in related art will be described with some specific examples. It is assumed here that an ReLU function is used as an example of the activation function and a time-series continuous image sequence is input.

As shown in FIG. 5, in the related art, first, a first image $X(t)$ is selected from the time-series continuous image sequence as the reference image and convolution processing F and activation function processing A are performed on the image $X(t)$ a plurality of times. In FIG. 5, the full connection processing and the softmax processing, which are performed in the latter stage, are omitted.

In related art, next, a second image $X(t+\Delta t)$ is selected from the time-series continuous image sequence as a proximity image that is close to the reference image and the convolution processing F and the activation function processing A are performed on the image X(t+Δt) a plurality of times.

However, under the assumption that the change amount between the first image X(t) and the second image X(t+Δt) is small, when the convolution processing F and the activation function processing A are executed on the image X(t+Δt), like in the image X(t), the amount of redundant calculations increases, which causes the computational load to increase.

In order to solve the above problem, in each example embodiment, the second image X(t+Δt) is treated as an image obtained by adding the first image X(t), and a difference image ΔX(t) between the image X(t) and the image X(t+Δt). Then, the results of performing the convolution processing F and the activation function processing A performed on the image X(t+Δt) are approximated to the results of the convolution processing F and the activation function processing A performed on the image X(t) and the product of a derivative value A' of the results of the convolution processing F and the activation function processing A performed on the image X(t) and the results of the convolution processing F performed on the difference image ΔX(t). At this time, the results that have already been calculated can be used for the results of the convolution processing F and the activation function processing A performed on the image X(t). Therefore, as the calculation of the convolution processing F for the image X(t+Δt), it is sufficient that only the product of the derivative value A' of the results of the convolution processing F and the activation function processing A performed on the image X(t) and the results of the convolution processing F performed on the difference image ΔX(t) be calculated.

Figure 6:
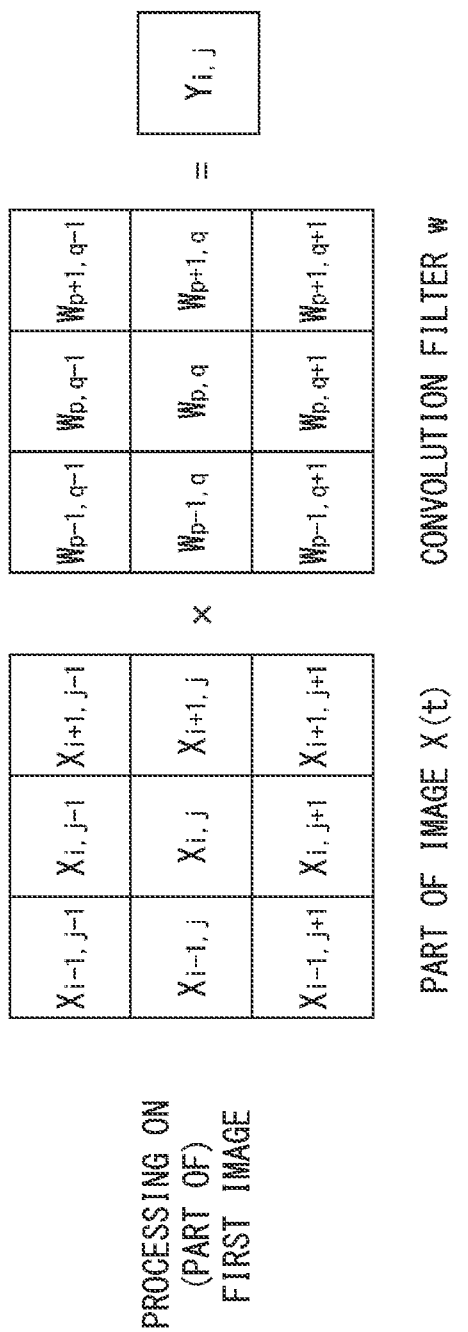
FIG. 6 is a diagram showing an example of data when the convolution processing according to each example embodiment is performed on a part of a first image $X(t)$.
Figure 7:
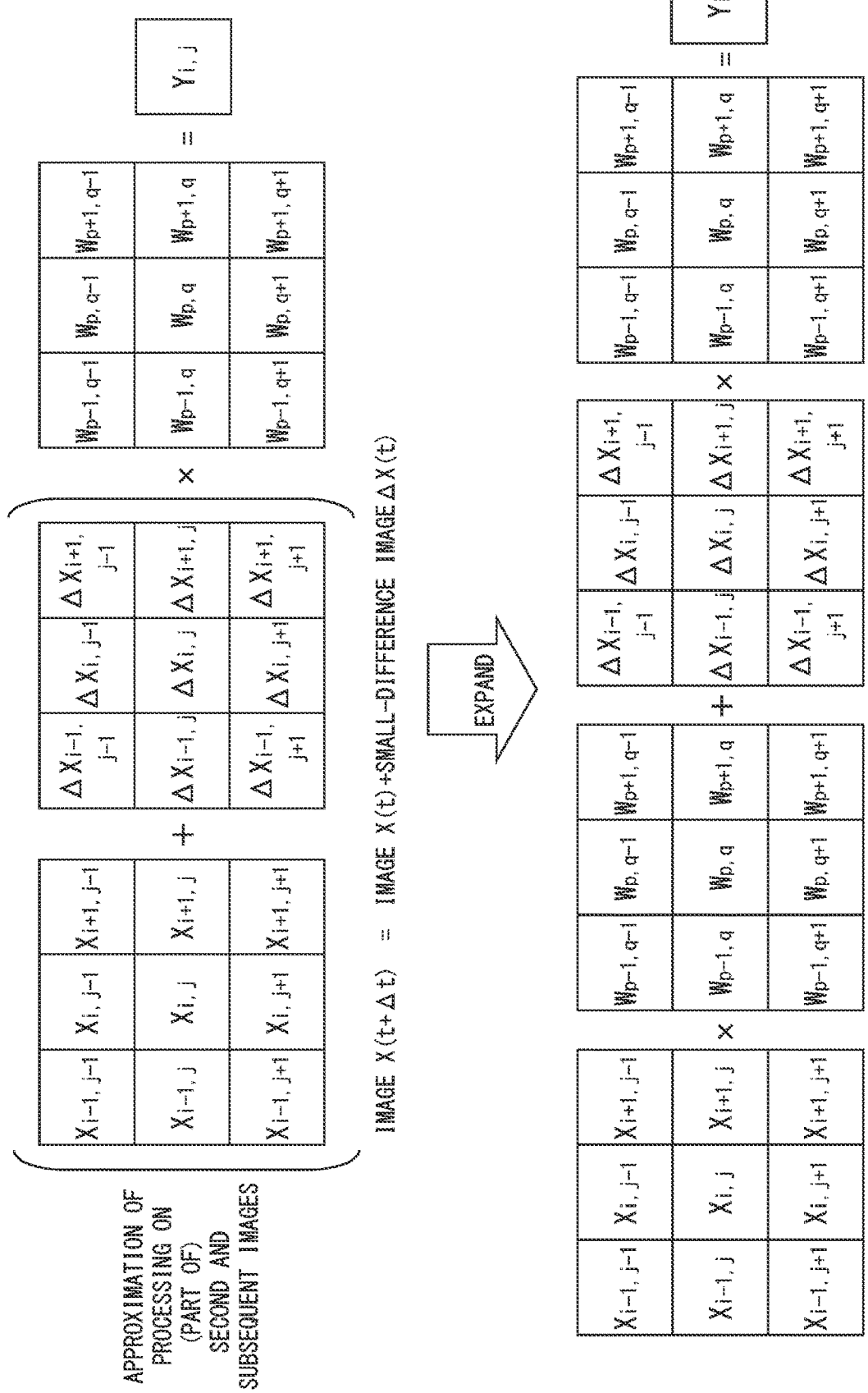
FIG. 7 is a diagram showing an example of data when the convolution processing according to each example embodiment is performed on a part of a second image $X(t+\Delta t)$

FIG. 6 shows an example of data when the convolution processing is performed on a part of the first image X(t). Further, FIG. 7 shows an example of data when convolution processing is performed on a part of the second image X(t+Δt). In FIGS. 6 and 7, the subscript t indicating time is omitted. As shown in FIG. 7, the second image X(t+Δt) is treated as an image obtained by adding the first image X(t) and the difference image ΔX(t). Then, the left side of the upper diagram in FIG. 7 is expanded as follows.

Image X(t)*convolution filter w+difference image ΔX(t) *convolution filter w

Next, the convolution processing and the activation function processing performed on the proximity image according to each example embodiment are expressed by mathematical expressions.

The convolution processing and the activation function processing in the first stage performed on the proximity image can be expressed as shown in the following mathematical expression 1.

[Mathematical expression 1]
$$f(x + \Delta x) = \\ f(x) + f'(x) \times \Delta x + \frac{1}{2} f''(x) \times \Delta x^2 + \ldots \approx \\ f(x) + f'(x) \times \Delta x$$

In the results of the convolution processing and the activation function processing in the mathematical expression 1, the first term is a function of the reference image and the second term is a function of the image change amount.

Further, the convolution processing and the activation function processing in the second stage performed on the proximity image can be expressed as shown in the following mathematical expression 2.

[Mathematical expression 2]
$$g(f + \Delta f) = \\ g(f) + g'(f) \times \Delta f + \frac{1}{2} g''(f) \times \Delta f^2 + \ldots \approx \\ g\{f(x)\} + g'\{f(x)\} \times \{f'(x) \times \Delta x\}$$

In the results of the convolution processing and the activation function processing in the mathematical expression 2, the first term is a function of the reference image and the second term is a function of the image change amount.

Further, by replacing f(x) by f and replacing Δf(x+Δx)≈f(x)*Δx by Δf for the sake of simplicity, the mathematical expression 2 can be expressed as shown in the following mathematical expression 3.

[Mathematical expression 3]
$$g(f + \Delta f) = \\ g(f) + g'(f) \times \Delta f + \frac{1}{2} g''(f) \times \Delta f^2 + \ldots \approx \\ g(f) + g'(f) \times \Delta f$$

FIG. 8 shows an example of the correspondence between the aforementioned mathematical expression in which the convolution processing and the activation function processing are expressed and data of the convolution processing shown in FIG. 7.

(1-2) Second Feature of Convolution Processing

Next, a second feature of the convolution processing according to each example embodiment will be described.

As described above, in the activation function processing, a constant value is output with respect to input values within a predetermined region. Further, the product of the derivative value of the results of the convolution processing and the activation function processing performed on the reference image and the results of the convolution processing performed on the difference image between the reference image and the proximity image is small.

Based on the above points, in the convolution processing and the activation function processing in each example embodiment, it is based on the reasonable assumption that, for elements within a predetermined region where the results of the activation function processing are a constant value among the results of the convolution processing performed on the reference image, even when the product of the derivative value of the results of the convolution processing and the activation function processing performed on the reference image and the results of the convolution processing performed on the difference image is added, the results of the activation function processing do not change in many cases.

Under the above assumption, in the convolution processing and the activation function processing in each example embodiment, for elements within a predetermined region where the results of the activation function processing are a constant value among the results of the convolution processing performed on the reference image, calculation of the product of the derivative value of the results of the convolution processing and the activation function processing performed on the reference image and the results of the convolution processing performed on the difference image is omitted. Accordingly, the amount of computation of the convolution processing performed on the proximity image is further reduced. When, for example, the activation function is an ReLU function, in the activation function processing, negative elements of the results of the convolution processing performed on the reference image are uniformly converted into a constant value 0. Therefore, regarding the negative elements of the results of the convolution processing performed on the reference image, even when the derivative value of the results of the convolution processing performed on the difference image is added, there is almost no change in the results of the activation function processing. Therefore, calculation of the product of the derivative value of the results of the convolution processing and the activation function processing performed on the reference image and the results of the convolution processing performed on the difference image can be omitted.

(2) Change Amount Limitation Processing

As described above, in the convolution processing and the activation function processing in each example embodiment, it is assumed that the assumption that the amount of change between the reference image and a proximity image that is close to the reference image is small is established.

However, if a difference image is simply created, in an image region where the contrast suddenly changes such as in the edge of an object, the state of the obtained image is far from the assumption that the amount of change between the reference image and the proximity image is small.

In order to solve the above problem, in each example embodiment, change amount limitation processing is performed on each of the reference image and the proximity image in order to limit the amount of change between the reference image and the proximity image to a small amount. The change amount limitation processing is, for example, processing of smoothing each of the reference image and the proximity image using a smoothing filter such as a Gaussian filter or processing of converting each of the reference image and the proximity image into a frequency space.

In each example embodiment described below, the above convolution processing and the above change amount limitation processing are performed in inference processing (image recognition processing).

Hereinafter, each example embodiment will be described in further detail.

First Example Embodiment

<Configuration of First Example Embodiment>

Figure 9:
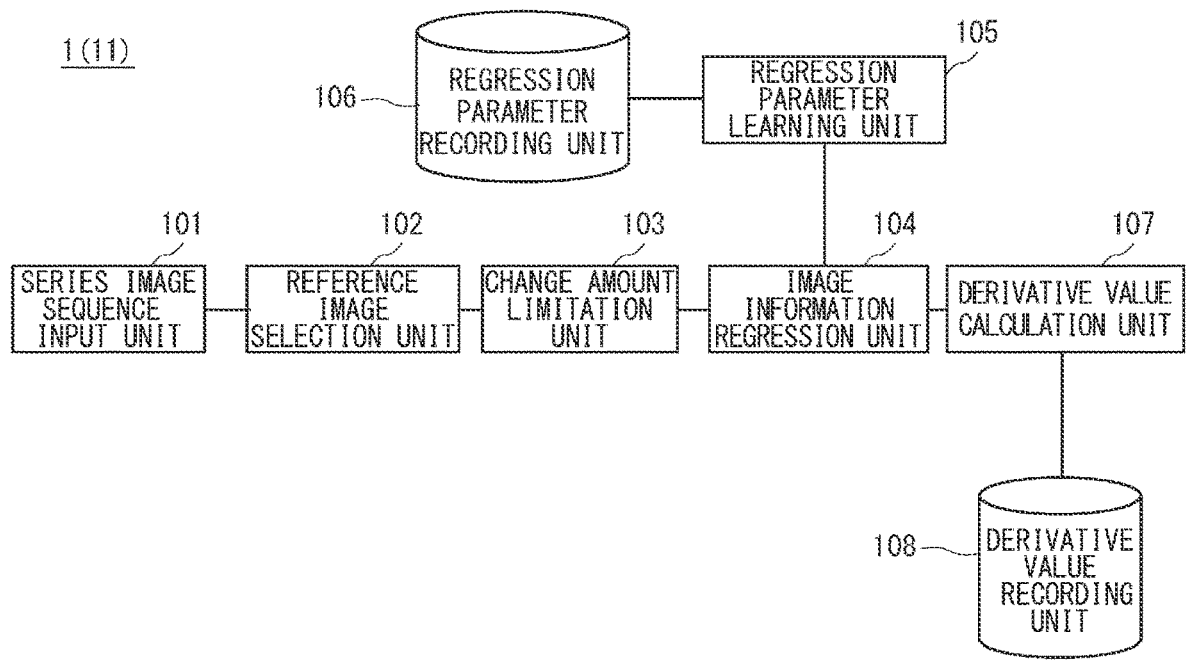
FIG. 9 is a block diagram showing a schematic configuration example of a learning processing unit in an image recognition system according to the first example embodiment.

Referring first to FIG. 9, a schematic configuration of a learning processing unit 11 in an image recognition system 1 according to a first example embodiment will be described.

As shown in FIG. 9, the learning processing unit 11 in the image recognition system 1 according to the first example embodiment includes a series image sequence input unit 101, a reference image selection unit 102, a change amount limitation unit 103, an image information regression unit 104, a regression parameter learning unit 105, a regression parameter recording unit 106, a derivative value calculation unit 107, and a derivative value recording unit 108.

The series image sequence input unit 101 inputs a series image sequence having sequentiality. The series image sequence is, for example, a time-series continuous image sequence continuously captured by a high-speed camera or the like, a multi-spectral image sequence or the like.

The reference image selection unit 102 selects a learning image from the series image sequence input to the series image sequence input unit 101.

The change amount limitation unit 103 performs the aforementioned change amount limitation processing on the learning image selected by the reference image selection unit 102. In the first example embodiment, it is assumed that the change amount limitation parameters indicating the degree of the change amount limitation processing is set in the change amount limitation unit 103 in advance. When, for example, the change amount limitation processing is smoothing processing, the change amount limitation parameters indicates a degree of smoothing (e.g., a level of smoothing indicating how far an image will be smoothed). Further, in the first example embodiment, it is assumed that smoothing processing is performed as the change amount limitation processing.

The image information regression unit 104 regresses the learning image smoothed by the change amount limitation unit 103. Specifically, the image information regression unit 104 performs the convolution processing and the activation function processing on the learning image a plurality of times and then performs the full connection processing and the softmax processing.

The regression parameter learning unit 105 learns regression parameters to be set in the image information regression unit 104 and a difference image information regression unit 117 that will be described later based on a ground truth label (a label indicating what kind of image the learning image is) attached to the learning image and results of inference inferred by regression processing of a learning image by the image information regression unit 104 (results of image recognition). The regression parameters are, for example, a weight coefficient or the like of an intermediate layer of the convolutional neural network. A gradient descent method or the like in the convolutional neural network may be, for example, used for learning of the regression parameters.

The regression parameter recording unit 106 records the regression parameters learned by the regression parameter learning unit 105.

The derivative value calculation unit 107 calculates the derivative value of the results of the convolution processing and the activation function processing in the regression processing performed on the learning image by the image information regression unit 104 every time the convolution processing and the activation function processing are performed. The derivative value is, in the case of the convolutional neural network, a convolutional filter value and a differential function of an activation function.

The derivative value recording unit 108 records the derivative value of the results of the convolution processing and the activation function processing calculated by the derivative value calculation unit 107 in association with the results of the convolution processing and the activation function processing.

Figure 10:
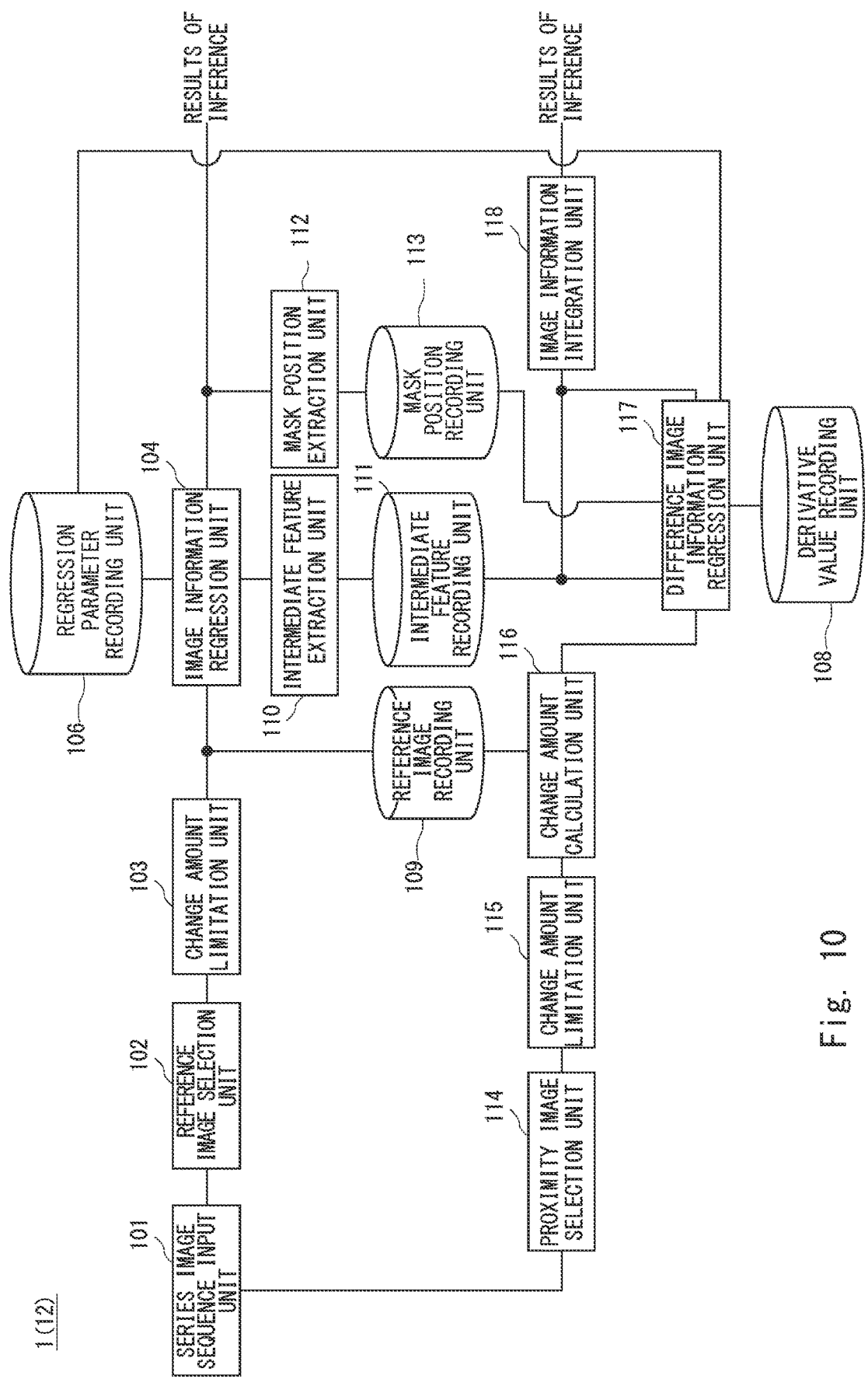
FIG. 10 is a block diagram showing a schematic configuration example of an inference processing unit in the image recognition system according to the first example embodiment.

Referring next to FIG. 10, a schematic configuration of the inference processing unit 12 in the image recognition system 1 according to the first example embodiment will be described. In the image recognition system 1 according to the first example embodiment, the learning processing unit 11 and the inference processing unit 12 use some components in a duplicated manner.

As shown in FIG. 10, the inference processing unit 12 in the image recognition system 1 according to the first example embodiment includes a series image sequence input unit 101, a reference image selection unit 102, a change amount limitation unit 103, an image information regression unit 104, a regression parameter recording unit 106, a derivative value recording unit 108, a reference image recording unit 109, an intermediate feature extraction unit 110, an intermediate feature recording unit 111, a mask position extraction unit 112, a mask position recording unit 113, a proximity image selection unit 114, a change amount limitation unit 115, a change amount calculation unit 116, a difference image information regression unit 117, and an image information integration unit 118.

The series image sequence input unit 101 inputs the series image sequence having sequentiality. The series image sequence has been described above.

The reference image selection unit 102 selects a reference image, which serves as a reference, from the series image sequence input to the series image sequence input unit 101.

The change amount limitation unit 103 performs the aforementioned change amount limitation processing on the reference image selected by the reference image selection unit 102. As described above, in the first example embodiment, the change amount limitation parameters are set in the change amount limitation unit 103 in advance, and the change amount limitation unit 103 performs smoothing processing as the change amount limitation processing.

The regression parameters recorded in the regression parameter recording unit 106 are set in the image information regression unit 104. The image information regression unit 104 regresses the reference image smoothed by the change amount limitation unit 103. Specifically, the image information regression unit 104 performs the convolution processing and the activation function processing on the reference image a plurality of times and then performs the full connection processing and the softmax processing, and outputs the results of the above processing as results of inference of the reference image (results of image recognition).

The reference image recording unit 109 records the reference image smoothed by the change amount limitation unit 103.

The intermediate feature extraction unit 110 extracts the results of the activation function processing as the intermediate feature every time the activation function processing is performed in the regression processing performed on the reference image by the image information regression unit 104.

The intermediate feature recording unit 111 records the intermediate feature extracted by the intermediate feature extraction unit 110.

The mask position extraction unit 112 extracts a mask position indicating an element position of a predetermined region where the results of the activation function processing performed by the image information regression unit 104 become a constant value (e.g., a negative region when the activation function is an ReLU function).

The mask position recording unit 113 records the mask position extracted by the mask position extraction unit 112.

The proximity image selection unit 114 selects a proximity image that is close to the reference image selected by the reference image selection unit 102 from the series image sequence input to the series image sequence input unit 101. When, for example, the series image sequence is a time-series continuous image sequence continuously captured by a high-speed camera or the like, the proximity image selection unit 114 sequentially selects one or more images captured following the reference image as a proximity image.

The change amount limitation unit 115 performs the aforementioned change amount limitation processing on the proximity image selected by the proximity image selection unit 114. In the first example embodiment, it is assumed that the change amount limitation parameters are set in the change amount limitation unit 115 in advance, like in the change amount limitation unit 103, and the change amount limitation unit 115 performs smoothing processing as the change amount limitation processing.

The change amount calculation unit 116 calculates an amount of change between the proximity image smoothed by the change amount limitation unit 115 and the smoothed reference image recorded in the reference image recording unit 109, that is, a difference image, which is an image of the difference between the smoothed reference image and the smoothed proximity image.

The regression parameters recorded in the regression parameter recording unit 106 are set in the difference image information regression unit 117. The difference image information regression unit 117 regresses the difference image calculated by the change amount calculation unit 116. Specifically, the difference image information regression unit 117 performs, on the difference image, the convolution processing, and calculation of the product of the results of the convolution processing and the derivative value of the intermediate feature of the results of the convolution processing and the activation function processing performed on the reference image a plurality of times. However, the difference image information regression unit 117 omits, for the elements that are in the mask position recorded in the mask position recording unit 113, the convolution processing on the difference image, and calculation of the product of the results of the convolution processing and the derivative value of the intermediate feature of the results of the convolution processing and the activation function processing performed on the reference image, and outputs a constant value (e.g., 0 when the activation function is an ReLU function). The difference image information regression unit 117 performs the convolution processing for elements other than those in the mask position and outputs the product of the results of the convolution processing and the derivative value of the intermediate feature of the results of the convolution processing and the activation function processing performed on the reference image. At this time, when calculating the derivative value of the intermediate feature of the results of the convolution processing and the activation function processing performed on the reference image, the difference image information regression unit 117 obtains the intermediate feature of the results of the activation function processing performed on the reference image by extracting it from the intermediate feature recording unit 111. Further, the difference image information regression unit 117 obtains, for the derivative value of the intermediate feature of the results of the activation function processing performed on the reference image, a derivative value that is associated with the intermediate feature of the results of the activation function processing performed on the reference image by extracting it from the derivative value recording unit 108.

The image information integration unit 118 receives the intermediate feature of the reference image recorded in the intermediate feature recording unit 111 (results of performing the convolution processing and the activation function processing on the reference image a plurality of times), and the intermediate feature of the difference image regressed by the difference image information regression unit 117 (results of performing the convolution processing on the difference image, and calculation of the product of the results of the convolution processing and the derivative value of the intermediate feature of the results of the convolution processing and the activation function processing performed on the reference image a plurality of times). The image information integration unit 118 performs processing of integrating these inputs (the full connection processing and the softmax processing) and outputs the results thereof as results of inference of the proximity image (results of image recognition).

<Operations of First Example Embodiment>

Hereinafter, an operation of the image recognition system 1 according to the first example embodiment will be described.

Figure 11:
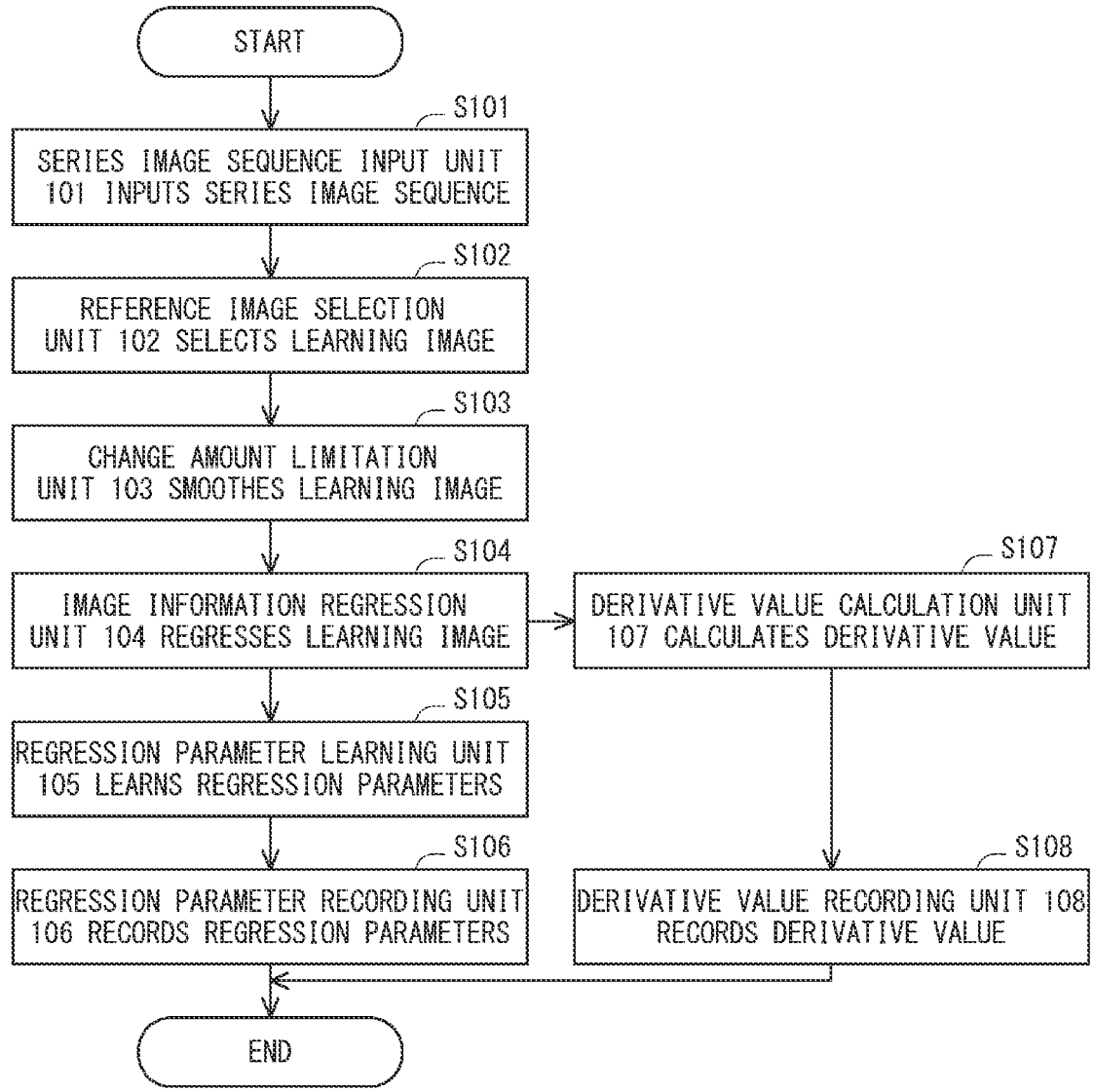
FIG. 11 is a flowchart for describing a schematic operation example when the learning processing unit in the image recognition system according to the first example embodiment performs learning.

Referring first to FIG. 11, a schematic operation when the learning processing unit 11 in the image recognition system 1 shown in FIG. 9 performs learning will be described.

As shown in FIG. 11, first, the series image sequence input unit 101 inputs the series image sequence (S101).

Next, the reference image selection unit 102 selects the learning image from the series image sequence input to the series image sequence input unit 101 (S102).

Next, the change amount limitation unit 103 smoothes the learning image selected by the reference image selection unit 102 (S103).

Next, the image information regression unit 104 regresses the learning image smoothed by the change amount limitation unit 103 (S104).

Next, the regression parameter learning unit 105 learns regression parameters to be set in the image information regression unit 104 and the difference image information regression unit 117 based on the results of inference (results of image recognition) inferred by regression processing of a learning image by the image information regression unit 104 (S105).

Next, the regression parameter recording unit 106 records the regression parameters learned by the regression parameter learning unit 105 (S106).

On the other hand, the derivative value calculation unit 107 calculates a derivative value of the results of the convolution processing and the activation function processing every time the convolution processing and the activation function processing are performed in regression processing of the learning image by the image information regression unit 104 (S107).

After that, the derivative value recording unit 108 records the derivative value calculated by the derivative value calculation unit 107 (S108).

Figure 12:
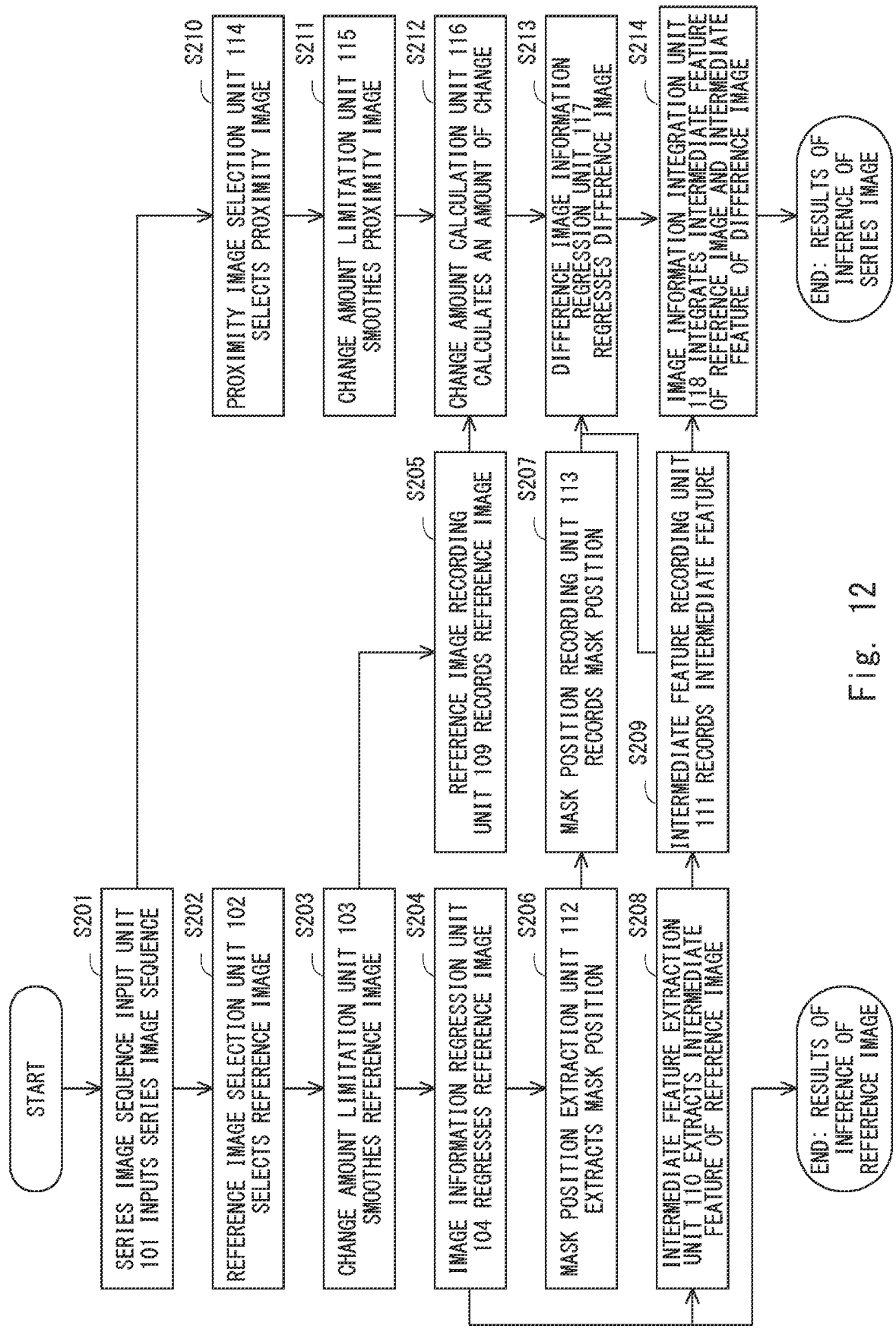
FIG. 12 is a flowchart for describing a schematic operation example when an inference processing unit in the image recognition system according to the first example embodiment performs inference.

Referring next to FIG. 12, a schematic operation when the inference processing unit 12 in the image recognition system 1 shown in FIG. 10 performs inference will be described.

As shown in FIG. 12, first, the series image sequence input unit 101 inputs the series image sequence (S201).

Next, the reference image selection unit 102 selects a reference image from the series image sequence input to the series image sequence input unit 101 (S202).

Next, the change amount limitation unit 103 smoothes the reference image selected by the reference image selection unit 102 (S203).

Next, the image information regression unit 104 regresses the reference image smoothed by the change amount limitation unit 103 (S204). At this time, regression parameters recorded in the regression parameter recording unit 106 are set in the image information regression unit 104. The results of the regression processing by the image information regression unit 104 are output as results of inference of the reference image (results of image recognition).

Further, the reference image recording unit 109 records the reference image smoothed by the change amount limitation unit 103 (S205).

Next, the mask position extraction unit 112 extracts a mask position indicating an element position of a predetermined region where the results of the activation function processing performed by the image information regression unit 104 become a constant value (S206).

Next, the mask position recording unit 113 records the mask position extracted by the mask position extraction unit 112 (S207).

Further, the intermediate feature extraction unit 110 extracts the results of the activation function processing as the intermediate feature every time the activation function processing is performed in the regression processing of the reference image performed by the image information regression unit 104 (S208).

Next, the intermediate feature recording unit 111 records the intermediate feature extracted by the intermediate feature extraction unit 110 (S209).

On the other hand, the proximity image selection unit 114 selects a proximity image that is close to the reference image selected by the reference image selection unit 102 from the series image sequence (S210).

Next, the change amount limitation unit 115 smoothes the proximity image selected by the proximity image selection unit 114 (S211).

Next, the change amount calculation unit 116 calculates an amount of change between the proximity image smoothed by the change amount limitation unit 115 and the smoothed reference image recorded in the reference image recording unit 109, that is, a difference image, which is an image of the difference between the smoothed reference image and the smoothed proximity image (S212).

Next, the difference image information regression unit 117 regresses the difference image calculated by the change amount calculation unit 116 (S213). At this time, the difference image information regression unit 117 omits, for the elements that are in the mask position recorded in the mask position recording unit 113, the convolution processing on the difference image, and calculation of the product of the results of the convolution processing and the derivative value of the intermediate feature of the results of the convolution processing and the activation function processing performed on the reference image, and outputs a constant value as the intermediate feature of the difference image. The difference image information regression unit 117 performs, for elements other than those in the mask position, the convolution processing, and outputs the product of the results of the convolution processing and the derivative value of the intermediate feature of the results of the convolution processing and the activation function processing performed on the reference image as the intermediate feature of the difference image. At this time, the difference image information regression unit 117 obtains the intermediate feature of the results of the activation function processing performed on the reference image by extracting it from the intermediate feature recording unit 111. Further, the difference image information regression unit 117 obtains, for the derivative value of the intermediate feature of the results of the activation function processing performed on the reference image, a derivative value that is associated with the intermediate feature of the results of the activation function processing performed on the reference image by extracting it from the derivative value recording unit 108. At this time, regression parameters recorded in the regression parameter recording unit 106 are set in the difference image information regression unit 117.

After that, the image information integration unit 118 performs processing of integrating the intermediate feature recorded in the intermediate feature recording unit 111 and the intermediate feature of the difference image regressed by the difference image information regression unit 117 (S214). The results of integration processing performed by the image information integration unit 118 are output as results of inference of the proximity image (results of image recognition).

<Effects of First Example Embodiment>

As described above, according to the first example embodiment, results of performing the convolution processing and the activation function processing on the proximity image are generated from the results of the convolution processing and the activation function processing performed on the reference image, and the product of the results of the convolution processing performed on the difference image between the reference image and the proximity image and the derivative value of the intermediate feature of the results of the convolution processing and the activation function processing performed on the reference image. In this way, in the convolution processing performed on the proximity image, results of the convolution processing and the activation function processing performed on the reference image may be used, and it is sufficient that the convolution processing performed on the difference image, and calculation of the product of the results of the convolution processing and the derivative value of the intermediate feature of the results of the convolution processing and the activation function processing performed on the reference image be performed. Accordingly, redundant calculations are reduced, whereby it is possible to perform image recognition processing with less computational load.

Further, according to the first example embodiment, for the components in a predetermined region that have a constant value among the results of the convolution processing and the activation function processing performed on the reference image, the convolution processing on the difference image, and calculation of the product of the results of the convolution processing and the derivative value of the intermediate feature of the results of the convolution processing and the activation function processing performed on the reference image are omitted. Accordingly, the amount of computation of the convolution processing and the activation function processing performed on the proximity image is further reduced.

Further, according to the first example embodiment, change amount limitation processing is performed on each of the reference image and the proximity image for limiting the amount of change between the reference image and the proximity image to a small amount. Accordingly, in an image region where the contrast suddenly changes as well, the amount of change between the reference image and the proximity image becomes small, whereby it is possible to generate results of performing the convolution processing and the activation function processing on the proximity image according to the aforementioned method.

The reference image selection unit 102 may be configured not to update a reference image any longer once it selects a reference image. According to this configuration, the processing of updating the reference image becomes unnecessary, which causes the amount of computation to be decreased. According to this configuration, however, the amount of change between the reference image and the proximity image gradually increases, whereby it is possible that the accuracy of image recognition may deteriorate.

Alternatively, the reference image selection unit 102 may be configured to reselect another image as a reference image to update the reference image when a predetermined event such as a case in which a predetermined period of time has passed after a reference image is selected or a case in which a predetermined number of proximity images have been selected after a reference image is selected has occurred. In this configuration, processing of updating the reference image is required, which causes the amount of computation to increase. However, according to this configuration, the increasing amount of change between the reference image and the proximity image can be regularly reset, whereby it is possible to prevent the accuracy of image recognition from deteriorating. Therefore, in view of the accuracy of image recognition, it is preferable to update the reference image.

Second Example Embodiment

In the aforementioned first example embodiment, the change amount limitation parameters indicating the degree of change amount limitation processing in the change amount limitation units 103 and 115 are set in the change amount limitation units 103 and 115 in advance.

On the other hand, in a second example embodiment, change amount limitation parameters in the change amount limitation units 103 and 115 are learned and the learned change amount limitation parameters are set in the change amount limitation units 103 and 115.

<Configuration of Second Example Embodiment>

Figure 13:
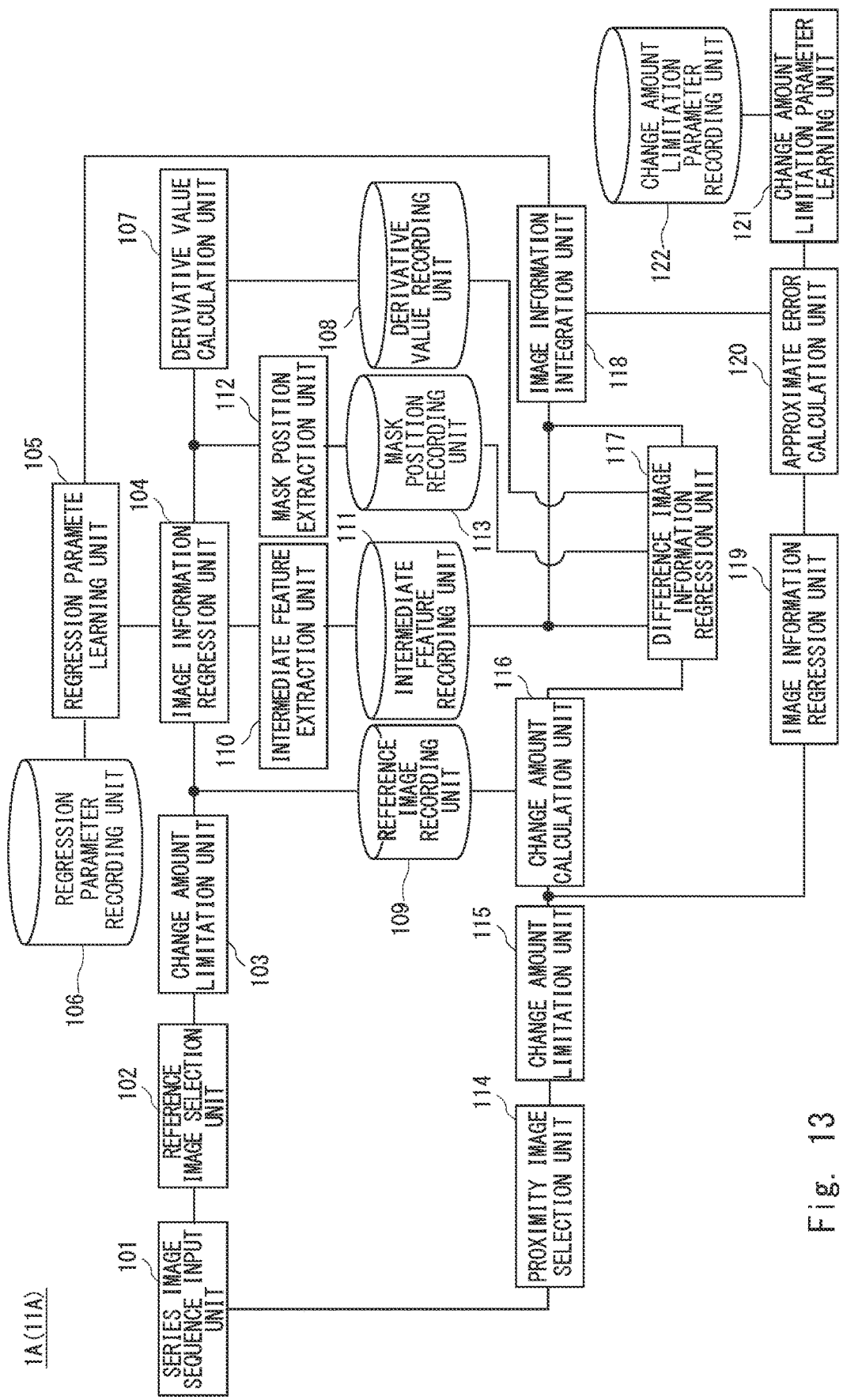
FIG. 13 is a block diagram showing a schematic configuration example of a learning processing unit in an image recognition system according to a second example embodiment.

Referring first to FIG. 13, a schematic configuration of a learning processing unit 11A in an image recognition system 1A according to the second example embodiment will be described.

As shown in FIG. 13, the learning processing unit 11A in the image recognition system 1A according to the second example embodiment includes a series image sequence input unit 101, a reference image selection unit 102, a change amount limitation unit 103, an image information regression unit 104, a regression parameter learning unit 105, a regression parameter recording unit 106, a derivative value calculation unit 107, a derivative value recording unit 108, a reference image recording unit 109, an intermediate feature extraction unit 110, an intermediate feature recording unit 111, a mask position extraction unit 112, a mask position recording unit 113, a proximity image selection unit 114, a change amount limitation unit 115, a change amount calculation unit 116, a difference image information regression unit 117, an image information integration unit 118, an image information regression unit 119, an approximate error calculation unit 120, a change amount limitation parameter learning unit 121, and a change amount limitation parameter recording unit 122.

The series image sequence input unit 101 inputs a series image sequence having sequentiality. The series image sequence has been described above.

The reference image selection unit 102 selects a learning reference image from the series image sequence input to the series image sequence input unit 101.

The change amount limitation unit 103 performs the aforementioned change amount limitation processing on the learning reference image selected by the reference image selection unit 102. It is assumed, in the second example embodiment, that the change amount limitation parameters are, as will be described later, learned by the change amount limitation parameter learning unit 121 and the learned change amount limitation parameters are set in the change amount limitation unit 103. Further, in the second example embodiment, it is assumed that smoothing processing is performed as the change amount limitation processing.

The image information regression unit 104 regresses the learning reference image smoothed by the change amount limitation unit 103. Specifically, the image information regression unit 104 performs the convolution processing and the activation function processing on the learning reference image a plurality of times and then performs the full connection processing and the softmax processing.

The regression parameter learning unit 105 learns regression parameters to be set in the image information regression unit 104 and the difference image information regression unit 117. For the learning reference image, the regression parameter learning unit 105 learns regression parameters based on a ground truth label attached to the learning reference image and the results of inference inferred by regression processing of a learning reference image by the image information regression unit 104 (results of image recognition). Further, for the learning proximity image that will be described later, the regression parameter learning unit 105 learns the regression parameters based on the ground truth label attached to the learning proximity image and the results of inference (results of image recognition) inferred by the integration processing performed by the image information integration unit 118.

The regression parameter recording unit 106 records the regression parameters learned by the regression parameter learning unit 105.

The derivative value calculation unit 107 calculates a derivative value of the results of the convolution processing and the activation function processing every time the convolution processing and the activation function processing are performed in the regression processing performed on the learning reference image by the image information regression unit 104.

The derivative value recording unit 108 records the derivative value of the results of the convolution processing and the activation function processing calculated by the derivative value calculation unit 107 in association with the results of the convolution processing and the activation function processing.

The reference image recording unit 109 records the learning reference image smoothed by the change amount limitation unit 103.

The intermediate feature extraction unit 110 extracts the results of the activation function processing as the intermediate feature every time the activation function processing is performed in the regression processing performed on the learning reference image by the image information regression unit 104.

The intermediate feature recording unit 111 records the intermediate feature extracted by the intermediate feature extraction unit 110.

The mask position extraction unit 112 extracts a mask position indicating an element position of a predetermined region where results of the activation function processing performed by the image information regression unit 104 become a constant value (e.g., a negative region when the activation function is an ReLU function).

The mask position recording unit 113 records the mask position extracted by the mask position extraction unit 112.

The proximity image selection unit 114 selects, from the series image sequence input to the series image sequence input unit 101, a learning proximity image that is close to the learning reference image selected by the reference image selection unit 102.

The change amount limitation unit 115 performs the aforementioned change amount limitation processing on the learning proximity image selected by the proximity image selection unit 114. In the second example embodiment, like in the change amount limitation unit 103, it is assumed that the change amount limitation parameters are learned by the change amount limitation parameter learning unit 121, the learned change amount limitation parameters are set in the change amount limitation unit 103, and the change amount limitation unit 115 performs smoothing processing as the change amount limitation processing.

The change amount calculation unit 116 calculates an amount of change between the learning proximity image smoothed by the change amount limitation unit 115 and the smoothed learning reference image recorded in the reference image recording unit 109, that is, a learning difference image, which is an image of the difference between the smoothed learning reference image and the smoothed learning proximity image.

The difference image information regression unit 117 regresses the learning difference image calculated by the change amount calculation unit 116. Specifically, the difference image information regression unit 117 performs the convolution processing on the learning difference image and calculation of the product of the results of the convolution processing and the derivative value of the intermediate feature of the results of the convolution processing and the activation function processing performed on the learning reference image a plurality of times. However, the difference image information regression unit 117 omits, for the elements that are in the mask position recorded in the mask position recording unit 113, the convolution processing performed on the learning difference image, and calculation of the product of the results of the convolution processing and the derivative value of the intermediate feature of the results of the convolution processing and the activation function processing performed on the learning reference image, and outputs a constant value. The difference image information regression unit 117 performs, for elements other than those in the mask position, the convolution processing, and outputs the product of the results of the convolution processing and the derivative value of the intermediate feature of the results of the convolution processing and the activation function processing performed on the learning reference image. At this time, when calculating the derivative value of the intermediate feature of the results of the convolution processing and the activation function processing performed on the learning reference image, the difference image information regression unit 117 obtains the intermediate feature of the results of the activation function processing performed on the learning reference image by extracting it from the intermediate feature recording unit 111. Further, for the derivative value of the intermediate feature of the results of the activation function processing performed on the learning reference image, the difference image information regression unit 117 obtains the derivative value associated with the intermediate feature of the results of the activation function processing performed on the learning reference image by extracting it from the derivative value recording unit 108.

The image information integration unit 118 receives the intermediate feature of the learning reference image recorded in the intermediate feature recording unit 111 (results of performing the convolution processing and the activation function processing on the learning reference image a plurality of times) and the intermediate feature of the learning difference image regressed by the difference image information regression unit 117 (results of performing the convolution processing on the learning difference image, and calculation of the product of the results of the convolution processing and the derivative value of the intermediate feature of the results of the convolution processing and the activation function processing performed on the learning reference image a plurality of times). The image information integration unit 118 performs processing of integrating these inputs (the full connection processing and the softmax processing).

The image information regression unit 119 regresses the learning proximity image smoothed by the change amount limitation unit 115. Specifically, the image information regression unit 119 performs the convolution processing and the activation function processing on the learning proximity image a plurality of times and then performs the full connection processing and the softmax processing.

The approximate error calculation unit 120 calculates an approximate error, which is an error between the results of inference of the learning proximity image inferred by the regression processing performed by the image information regression unit 119 (results of image recognition) and the results of inference of the learning proximity image inferred by the integration processing performed by the image information integration unit 118 (results of image recognition).

The results of inference of the learning proximity image performed by the image information integration unit 118 (results of image recognition) are results of performing inference using results obtained by approximating the results of performing the convolution processing and the activation function processing on the proximity image to the results of the convolution processing and the activation function processing performed on the reference image and the product of the results of the convolution processing performed on the difference image between the reference image and the proximity image and the derivative value of the intermediate feature of the results of the convolution processing and the activation function processing performed on the reference image. On the other hand, results of inference of the learning proximity image performed by the image information regression unit 119 (results of image recognition) are results of performing inference using the results of the convolution processing performed on the proximity image without approximating the same. Therefore, the approximate error calculated by the approximate error calculation unit 120 is an index indicating how much the results of inference (results of image recognition) have been changed as results of approximation of the results of the convolution processing performed on the proximity image.

The change amount limitation parameter learning unit 121 learns the change amount limitation parameters to be set in the change amount limitation units 103 and 115 based on the approximate error calculated by the approximate error calculation unit 120. Specifically, the change amount limitation parameter learning unit 121 learns the change amount limitation parameters so as to minimize the error calculated by the approximate error calculation unit 120.

The change amount limitation parameter recording unit 122 records the change amount limitation parameters learned by the change amount limitation parameter learning unit 121.

Figure 14:
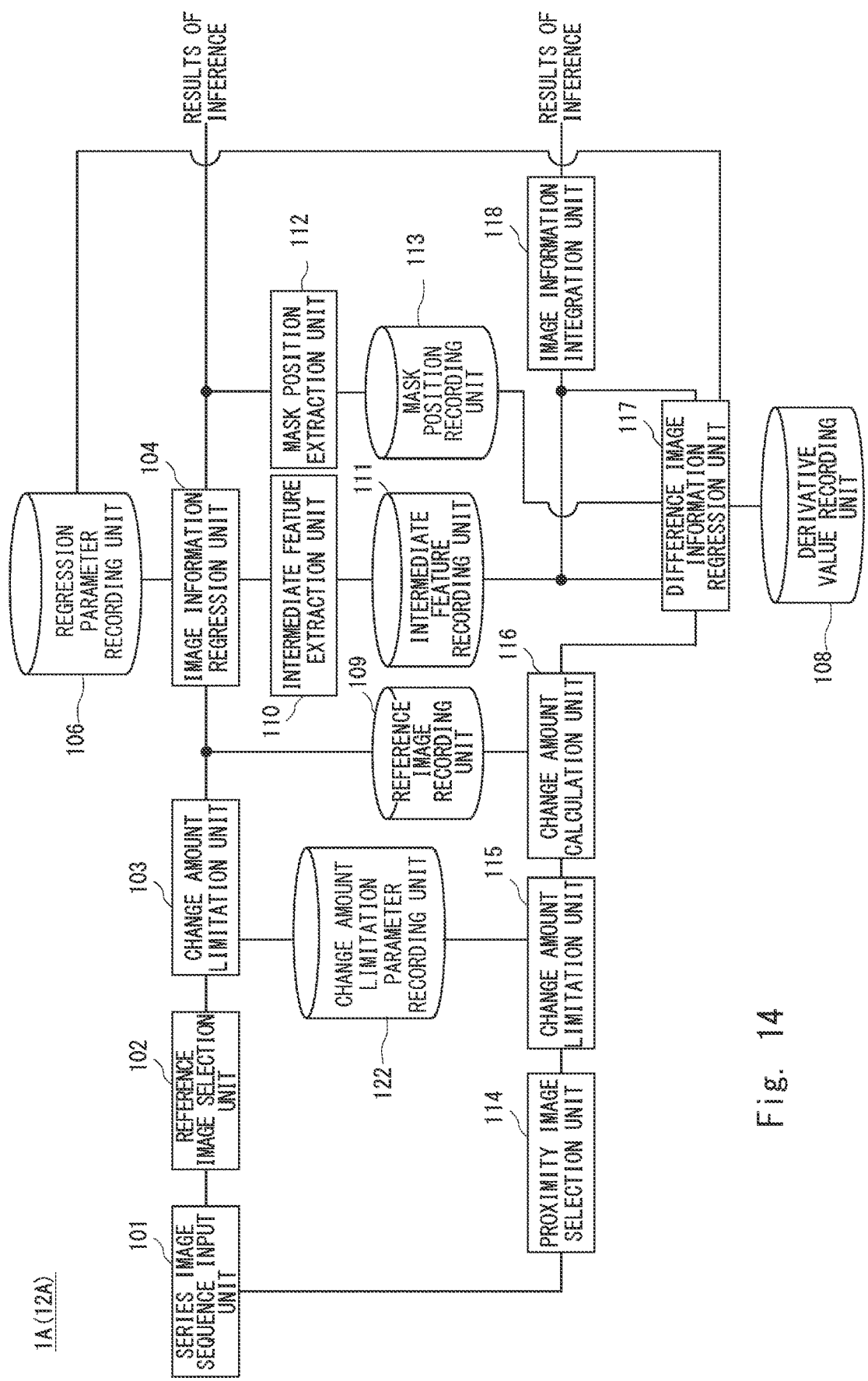
FIG. 14 is a block diagram showing a schematic configuration example of an inference processing unit in the image recognition system according to the second example embodiment.

Next, with reference to FIG. 14, a schematic configuration of an inference processing unit 12A in the image recognition system 1A according to the second example embodiment will be described. In the image recognition system 1A according to the second example embodiment, the learning processing unit 11A and the inference processing unit 12A use some components in a duplicated manner.

As shown in FIG. 12, the inference processing unit 12A in the image recognition system 1A according to the second example embodiment further includes, besides the components included in the aforementioned inference processing unit 12 according to the first example embodiment described with reference to FIG. 10, a change amount limitation parameter recording unit 122.

The change amount limitation parameters recorded in the change amount limitation parameter recording unit 122 are set in the change amount limitation units 103 and 115, and the change amount limitation units 103 and 115 perform change amount limitation processing with the degree in accordance with the change amount limitation parameters.

Since the configurations of the inference processing unit 12A in the image recognition system 1A according to the second example embodiment other than those described above are similar to those of the inference processing unit 12 according to the first example embodiment described above, the descriptions thereof will be omitted.

<Operation of Second Example Embodiment>

Hereinafter, an operation of the image recognition system 1A according to the second example embodiment will be described.

Figure 15:
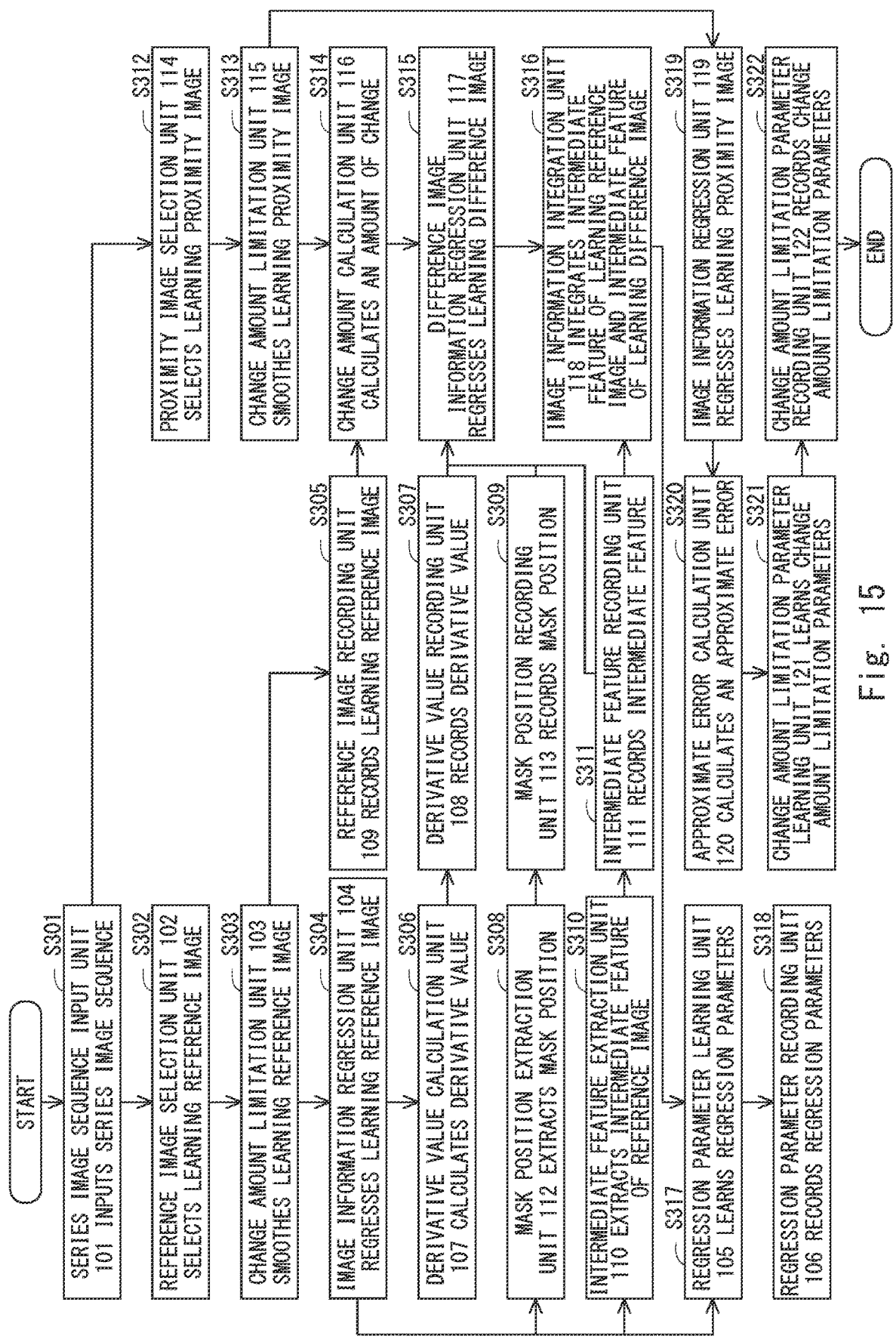
FIG. 15 is a flowchart for describing a schematic operation example when a learning processing unit in the image recognition system according to the second example embodiment performs learning.

Referring first to FIG. 15, a schematic operation when the learning processing unit 11A in the image recognition system 1A shown in FIG. 13 performs learning will be described.

As shown in FIG. 15, first, the series image sequence input unit 101 inputs the series image sequence (S301).

Next, the reference image selection unit 102 selects a learning reference image from the series image sequence input to the series image sequence input unit 101 (S302).

Next, the change amount limitation unit 103 smoothes the learning reference image selected by the reference image selection unit 102 (S303).

Next, the image information regression unit 104 regresses the learning reference image smoothed by the change amount limitation unit 103 (S304).

Further, the reference image recording unit 109 records the learning reference image smoothed by the change amount limitation unit 103 (S305).

The derivative value calculation unit 107 calculates, in regression processing of the learning reference image by the image information regression unit 104, a derivative value of the results of the convolution processing and the activation function processing every time the convolution processing and the activation function processing are performed (S306).

Next, the derivative value recording unit 108 records the derivative value calculated by the derivative value calculation unit 107 (S307).

Further, the mask position extraction unit 112 extracts a mask position indicating an element position of a predetermined region where the results of the activation function processing performed by the image information regression unit 104 become a constant value (S308).

Next, the mask position recording unit 113 records the mask position extracted by the mask position extraction unit 112 (S309).

Further, the intermediate feature extraction unit 110 extracts the results of the activation function processing as the intermediate feature every time the activation function processing is performed in the regression processing of a learning reference image by the image information regression unit 104 (S310).

Next, the intermediate feature recording unit 111 records the intermediate feature extracted by the intermediate feature extraction unit 110 (S311).

On the other hand, the proximity image selection unit 114 selects a learning proximity image that is close to the learning reference image selected by the reference image selection unit 102 from the series image sequence (S312).

Next, the change amount limitation unit 115 smoothes the learning proximity image selected by the proximity image selection unit 114 (S313).

Next, the change amount calculation unit 116 calculates an amount of change between the learning proximity image smoothed by the change amount limitation unit 115 and the smoothed learning reference image recorded in the reference image recording unit 109, that is, a learning difference image, which is an image of the difference between the smoothed learning reference image and the smoothed learning proximity image (S314).

Next, the difference image information regression unit 117 regresses the learning difference image calculated by the change amount calculation unit 116 (S315). At this time, the difference image information regression unit 117 omits, for the elements that are in the mask position recorded in the mask position recording unit 113, the convolution processing performed on the learning difference image, and calculation of the product of the results of the convolution processing and the derivative value of the intermediate feature of the results of the convolution processing and the activation function processing performed on the learning reference image, and outputs a constant value as the intermediate feature of the learning difference image. The difference image information regression unit 117 performs, for the elements other than those in the mask position, the convolution processing and outputs the product of the results of the convolution processing and the derivative value of the intermediate feature of the results of the convolution processing and the activation function processing performed on the learning reference image as the intermediate feature of the learning difference image. At this time, the difference image information regression unit 117 obtains the intermediate feature of the results of the activation function processing performed on the learning reference image by extracting it from the intermediate feature recording unit 111. Further, the difference image information regression unit 117 obtains, for the derivative value of the intermediate feature of the results of the activation function processing performed on the learning reference image, the derivative value associated with the intermediate feature of the results of the activation function processing performed on the learning reference image by extracting it from the derivative value recording unit 108.

Next, the image information integration unit 118 performs processing of integrating the intermediate feature of the learning reference image recorded in the intermediate feature recording unit 111 and the intermediate feature of the learning difference image regressed by the difference image information regression unit 117 (S316).

Next, the regression parameter learning unit 105 learns regression parameters to be set in the image information regression unit 104 and the difference image information regression unit 117 (S317). At this time, the regression parameter learning unit 105 learns, for the learning reference image, regression parameters based on the results of inference inferred by regression processing of a learning reference image by the image information regression unit 104 (results of image recognition). Further, the regression parameter learning unit 105 learns, for the learning proximity image, regression parameters based on the results of inference inferred in the integration processing performed by the image information integration unit 118 (results of image recognition). Next, the regression parameter recording unit 106 records the regression parameters learned by the regression parameter learning unit 105 (S318).

On the other hand, the image information regression unit 119 regresses the learning proximity image smoothed by the change amount limitation unit 115 (S319).

Next, the approximate error calculation unit 120 calculates an approximate error, which is an error between the results of inference of the learning proximity image inferred by the regression processing performed by the image information regression unit 119 (results of image recognition) and the results of inference of the learning proximity image inferred by the integration processing performed by the image information integration unit 118 (results of image recognition) (S320).

Next, the change amount limitation parameter learning unit 121 learns change amount limitation parameters to be set in the change amount limitation units 103 and 115 based on the approximate error calculated by the approximate error calculation unit 120 (S321). Specifically, the change amount limitation parameter learning unit 121 learns the change amount limitation parameters so as to minimize the approximate error.

After that, the change amount limitation parameter recording unit 122 records the change amount limitation parameters learned by the change amount limitation parameter learning unit 121 (S322).

Figure 16:
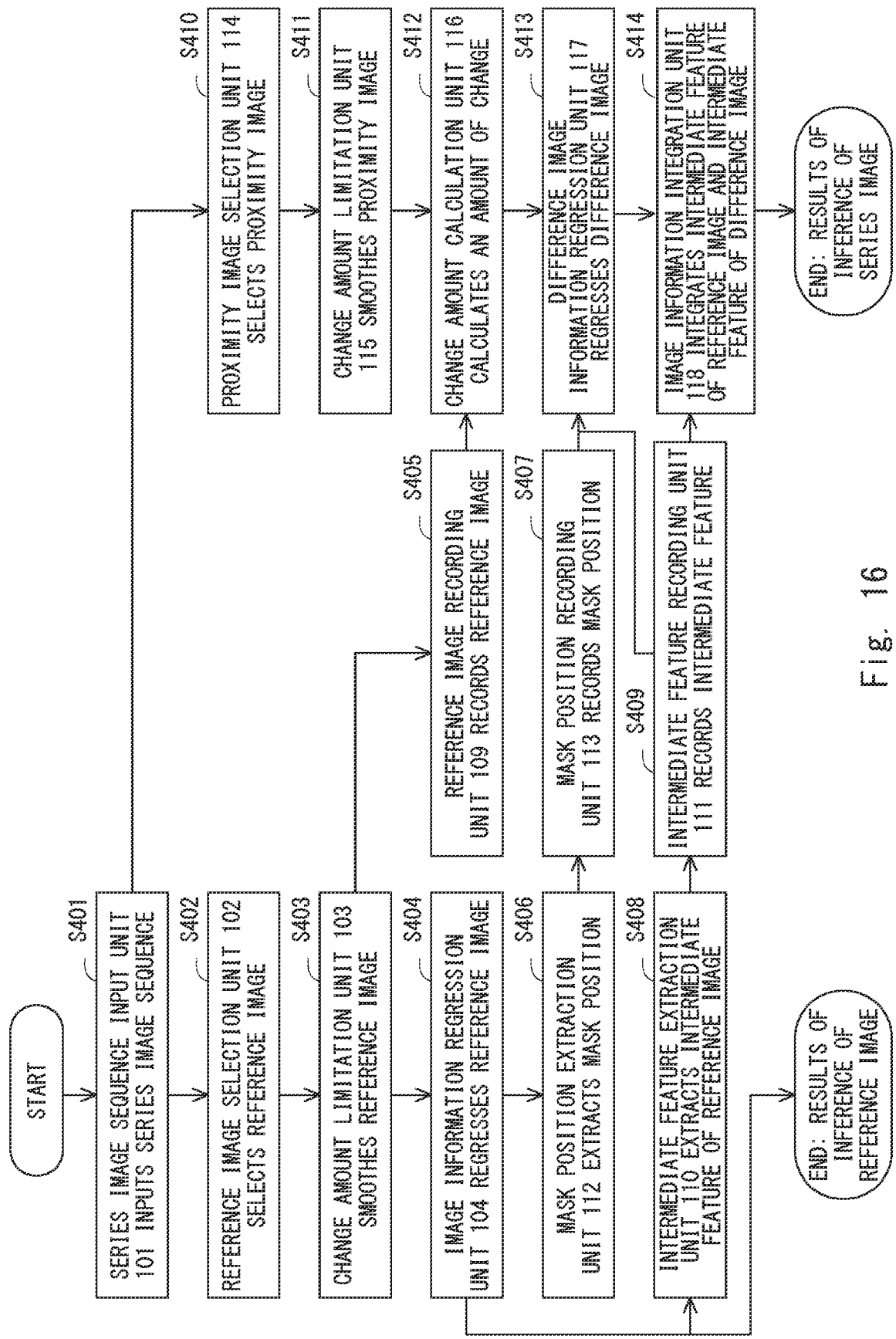
FIG. 16 is a flowchart for describing a schematic operation example when an inference processing unit in the image recognition system according to the second example embodiment performs inference.

Referring next to FIG. 16, a schematic operation when the inference processing unit 12A in the image recognition system 1A shown in FIG. 14 performs inference will be described.

As shown in FIG. 16, first, the series image sequence input unit 101 inputs the series image sequence (S401).

Next, the reference image selection unit 102 selects a reference image from the series image sequence input to the series image sequence input unit 101 (S402).

Next, the change amount limitation unit 103 smoothes the reference image selected by the reference image selection unit 102 (S403). At this time, the change amount limitation parameters recorded in the change amount limitation parameter recording unit 122 are set in the change amount limitation unit 103, and the change amount limitation unit 103 performs change amount limitation processing (in the second example embodiment, smoothing processing) with the degree in accordance with the change amount limitation parameters.

After that, S404-S409 similar to S204-S209 shown in FIG. 12 are performed.

On the other hand, the proximity image selection unit 114 selects the proximity image that is close to the reference image selected by the reference image selection unit 102 from the series image sequence (S410).

Next, the change amount limitation unit 115 smoothes the proximity image selected by the proximity image selection unit 114 (S411). At this time, the change amount limitation parameters recorded in the change amount limitation parameter recording unit 122 are set in the change amount limitation unit 115, and the change amount limitation unit 115 performs the change amount limitation processing (in the second example embodiment, smoothing processing) with the degree in accordance with the change amount limitation parameters.

After that, S412-S414 similar to S212-S214 shown in FIG. 12 are performed.

<Effects of Second Example Embodiment>

As described above, according to the second example embodiment, change amount limitation parameters indicating the degree of change amount limitation processing for limiting the amount of change between the reference image and the proximity image are learned. Specifically, the change amount limitation parameters are learned so as to minimize the error between the results of image recognition using the results obtained by approximating the results of performing the convolution processing and the activation function processing on the proximity image and the results of image recognition using the results of performing the convolution processing and the activation function processing on the proximity image without approximating the same. Accordingly, the results of the image recognition when the results of performing the convolution processing and the activation function processing on the proximity image are approximated can be made close to the results of the image recognition when the above results are not approximated, whereby it is possible to improve the accuracy of image recognition.

The other effects of the second example embodiment are similar to those described in the first example embodiment.

<Concept of Each Example Embodiment>

Figure 17:
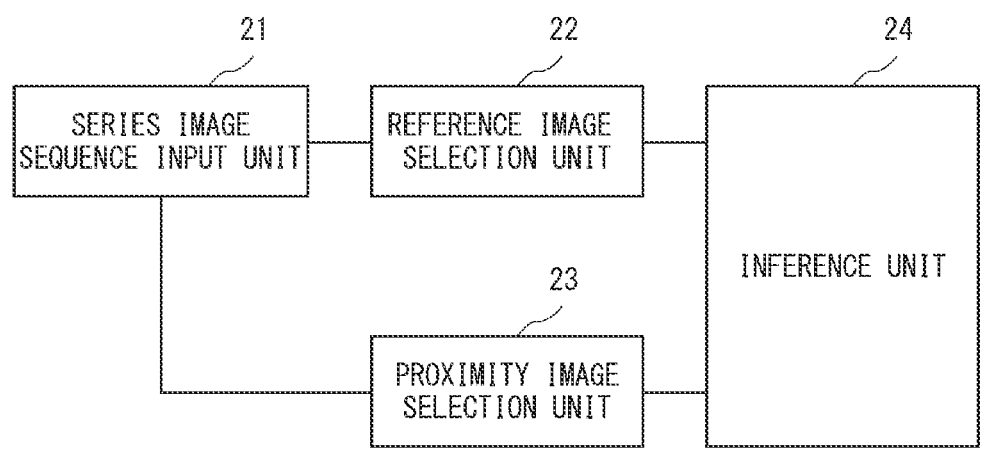
FIG. 17 is a block diagram showing a schematic configuration example of an image recognition system conceptually showing each example embodiment.

Referring next to FIG. 17, a configuration of the image recognition system 2 in which each of the aforementioned example embodiments is conceptually shown will be described.

As shown in FIG. 17, the image recognition system 2 includes a series image sequence input unit 21, a reference image selection unit 22, a proximity image selection unit 23, and an inference unit 24.

The series image sequence input unit 21 inputs a series image sequence having sequentiality. The series image sequence input unit 21 corresponds to the series image sequence input unit 101 shown in FIGS. 10 and 14.

The reference image selection unit 22 selects a reference image from the series image sequence input to the series image sequence input unit 21. The reference image selection unit 22 corresponds to the reference image selection unit 102 shown in FIGS. 10 and 14.

The proximity image selection unit 23 selects a proximity image that is close to the reference image selected by the reference image selection unit 22 from the series image sequence input to the series image sequence input unit 21. The proximity image selection unit 23 corresponds to the proximity image selection unit 114 shown in FIGS. 10 and 14.

The inference unit 24 recognizes the reference image and the proximity image by performing inference processing including the convolution processing and the activation function processing on the reference image and the proximity image selected by the reference image selection unit 22 and the proximity image selection unit 23, respectively. The activation function processing is processing of outputting a constant value with respect to input values within a predetermined region. The inference unit 24 corresponds to the components obtained by removing the series image sequence input unit 101, the reference image selection unit 102, and the proximity image selection unit 114 from the components shown in FIGS. 10 and 14.

The inference unit 24 generates results of performing the convolution processing and the activation function processing on the proximity image from the results of the convolution processing and the activation function processing performed on the reference image, and the product of the convolution processing performed on a difference image, which is an image of the difference between the reference image and the proximity image, and the derivative value of the results of the convolution processing and the activation function processing performed on the reference image.

Further, the inference unit 24 may omit, for elements in a predetermined region where the results of the activation function processing become a constant value among the results of the convolution processing and the activation function processing performed on the reference image, calculation of the product of the results of the convolution processing performed on the difference image and the derivative value of the results of the convolution processing and the activation function processing performed on the reference image. That is, the inference unit 24 may output, for the elements in a predetermined region where the results of the activation function processing become a constant value among the results of the convolution processing performed on the reference image, a constant value as the results of the activation function processing.

Further, change amount limitation units that are respectively arranged between the reference image selection unit 22 and the inference unit 24 and between the proximity image selection unit 23 and the inference unit 24 and that perform change amount limitation processing of limiting the amount of change between the reference image and the proximity image may be further included. These change amount limitation units correspond to the change amount limitation units 103 and 115 shown in FIGS. 10 and 14.

Further, a learning unit configured to learn change amount limitation parameters indicating the degree of the change amount limitation processing in the aforementioned change amount limitation unit may be further included. This learning unit corresponds to the components obtained by removing the series image sequence input unit 101, the reference image selection unit 102, and the proximity image selection unit 114 from the components shown in FIG. 13.

The aforementioned learning unit may learn the change amount limitation parameters as shown below. That is, first, the learning unit performs first recognition processing of recognizing the proximity image using the results of performing the convolution processing and the activation function processing performed on the proximity image generated from the results of the convolution processing and the activation function processing performed on the reference image, and the product of the results of the convolution processing performed on the difference image and the derivative value of the results of the convolution processing and the activation function processing performed on the reference image. Then, the learning unit performs the convolution processing and the activation function processing on the proximity image and performs second recognition processing for recognizing the proximity image using the results of the convolution processing and the activation function processing. After that, the learning unit learns the change amount limitation parameters so as to minimize the error between the results of the first recognition processing and the results of the second recognition processing.

Further, when a predetermined event has occurred after the reference image has been selected, the reference image selection unit 22 may reselect another image as the reference image from the series image sequence, and update the reference image.

<Hardware Configuration According to Each Example Embodiment>

The image recognition systems 1 and 1A of the first and second example embodiments described above may each be implemented by one computer (image recognition apparatus). Hereinafter, referring to FIG. 18, a hardware configuration of a computer 3 that achieves the image recognition systems 1 and 1A of the first and second example embodiments will be described.

Figure 18:
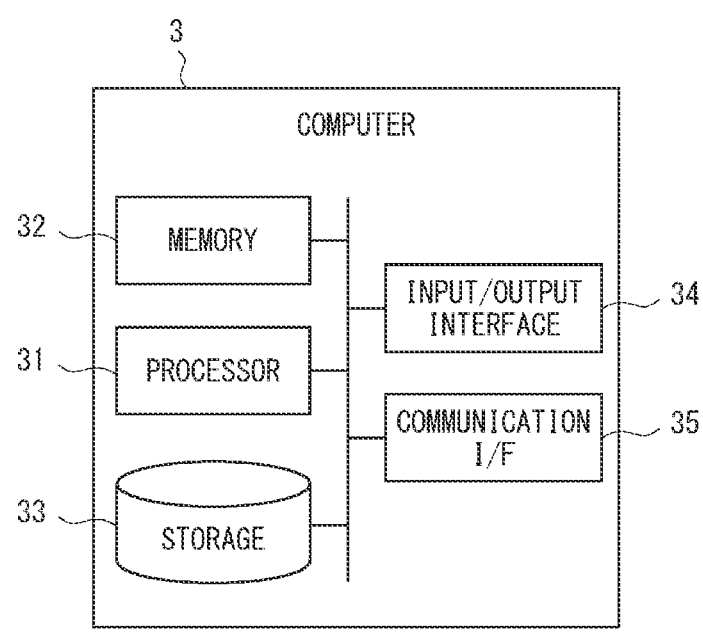
FIG. 18 is a block diagram showing a hardware schematic configuration example of a computer that implements an image recognition system according to each example embodiment.

As shown in FIG. 18, the image recognition systems 1 and 1A of the first and second example embodiments may each be implemented by the computer 3. The computer 3 includes a processor 31, a memory 32, a storage 33, an input/output interface (input/output I/F) 34, a communication interface (communication I/F) 35 and so on. The processor 31, the memory 32, the storage 33, the input/output interface 34, and the communication interface 35 are connected by a data transmission path for transmitting and receiving data to and from each other.

The processor 31 is, for example, an arithmetic processing apparatus such as a Central Processing Unit (CPU) or a Graphics Processing Unit (GPU). The memory 32 is, for example, a memory such as a Random Access Memory (RAM) or a Read Only Memory (ROM). The storage 33 is, for example, a storage device such as a Hard Disk Drive (HDD), a Solid State Drive (SSD), or a memory card. Further, the storage 33 may be a memory such as a RAM or a ROM.

The storage 33 stores a program (image recognition program) that implements the functions of components included in the image recognition system according to each of the first and second example embodiments (the components other than the regression parameter recording unit 106, the derivative value recording unit 108, the reference image recording unit 109, the intermediate feature recording unit 111, the mask position recording unit 113, and the change amount limitation parameter recording unit 122, the same as follows). The processor 31 implements the functions of the respective components of the image recognition system according to each of the first and second example embodiments by executing each of the above programs. When the processor 31 executes each of these programs, the processor 31 may execute these programs after loading them into the memory 32 or may execute them without loading them into the memory 32. Further, the memory 32 and the storage 33 also serve as the regression parameter recording unit 106, the derivative value recording unit 108, the reference image recording unit 109, the intermediate feature recording unit 111, the mask position recording unit 113, and the change amount limitation parameter recording unit 122.

Further, the aforementioned program(s) can be stored and provided to a computer (including the computer 3) using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc-Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The input/output interface 34 is connected to a display device, an input device, etc. (not shown). The display device is a device such as, for example, a Liquid Crystal Display (LCD) or a Cathode Ray Tube (CRT) display that displays a screen that corresponds to drawing data processed by the processor 31. Further, the input device is, for example, a device that accepts operation input by an operator, and is, for example, a keyboard, a mouse, a touch sensor and the like. The display device and the input device may be integrated and may be provided as a touch panel.

The communication interface 35 transmits data to or receives data from an external device. For example, the communication interface 35 communicates with an external device via a wired network or a wireless network.

While the present disclosure has been described above with reference to the example embodiments, the present disclosure is not limited to the aforementioned example embodiments. Various changes that may be understood by those skilled in the art can be made to the configuration and the details of the present disclosure within the scope of the present disclosure.

REFERENCE SIGNS LIST 1, 1A Image Recognition System
101 Series Image Sequence Input Unit
102 Reference Image Selection Unit
103 Change Amount Limitation Unit
104 Image Information Regression Unit
105 Regression Parameter Learning Unit
106 Regression Parameter Recording Unit
107 Derivative Value Calculation Unit
108 Derivative Value Recording Unit
109 Reference Image Recording Unit
110 Intermediate Feature Extraction Unit
111 Intermediate Feature Recording Unit
112 Mask Position Extraction Unit
113 Mask Position Recording Unit
114 Proximity Image Selection Unit
115 Change Amount Limitation Unit
116 Change Amount Calculation Unit
117 Difference image Information Regression Unit
118 Image Information Integration Unit
119 Image Information Regression Unit
120 Approximate Error Calculation Unit
121 Change Amount Limitation Parameter Learning Unit
122 Change Amount Limitation Parameter Recording Unit
2 Image Recognition System
21 Series Image Sequence Input Unit
22 Reference Image Selection Unit
23 Proximity Image Selection Unit
24 Inference Unit
3 Computer
31 Processor
32 Memory
33 Storage
34 Input/output Interface
35 Communication Interface

What is claimed is:

1. An image recognition system comprising:
a series image sequence input unit configured to input a series image sequence having sequentiality;
a reference image selection unit configured to select a reference image from the series image sequence;
a proximity image selection unit configured to select a proximity image that is close to the reference image from the series image sequence; and
an inference unit configured to recognize the reference image and the proximity image by performing inference processing on the reference image and the proximity image, the inference processing comprising convolution processing and activation function processing for outputting a constant value with respect to an input value within a predetermined region, wherein
the inference unit generates results of performing the convolution processing and the activation function processing on the proximity image from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

2. The image recognition system according to claim 1, wherein the inference unit omits, for elements within the predetermined region where the results of the activation function processing become a constant value among the results of the convolution processing and the activation function processing performed on the reference image, calculation of the product of the result of the convolution processing performed on the difference image and the derivative value of the results of the convolution processing and the activation function processing performed on the reference image.

3. The image recognition system according to claim 2, wherein the inference unit outputs, for elements within the predetermined region where the results of the activation function processing become a constant value among the results of the convolution processing and the activation function processing performed on the reference image, the constant value as the result of the activation function processing.

4. The image recognition system according to claim 1, further comprising change amount limitation units that are respectively arranged between the reference image selection unit and the inference unit and between the proximity image selection unit and the inference unit and limit the amount of change between the reference image and the proximity image.

5. The image recognition system according to claim 4, further comprising a learning unit configured to learn a change amount limitation parameters indicating a degree of the change amount limitation processing in the change amount limitation unit, wherein
the learning unit performs first recognition processing for recognizing the proximity image using the results of performing the convolution processing and the activation function processing on the proximity image generated from the results of the convolution processing and the activation function processing performed on the reference image, and the result of the product of the result of the convolution processing performed on the difference image and the derivative value of the results of the convolution processing and the activation function processing performed on the reference image,
the learning unit performs convolution processing and activation function processing on the proximity image and performs second recognition processing that recognizes the proximity image using the results of the convolution processing and the activation function processing, and
the learning unit learns the change amount limitation parameter so as to minimize an error between the result of the first recognition processing and the result of the second recognition processing.

6. The image recognition system according to claim 1, wherein, when a predetermined event has occurred after the reference image selection unit selects the reference image, the reference image selection unit selects another image from the series image sequence as the reference image and updates the reference image.

7. An image recognition apparatus comprising:
a series image sequence input unit configured to input a series image sequence having sequentiality;
a reference image selection unit configured to select a reference image from the series image sequence;
a proximity image selection unit configured to select a proximity image that is close to the reference image from the series image sequence; and
an inference unit configured to recognize the reference image and the proximity image by performing inference processing on the reference image and the proximity image, the inference processing comprising convolution processing and activation function processing for outputting a constant value with respect to an input value within a predetermined region, wherein
the inference unit generates results of performing the convolution processing and the activation function processing on the proximity image from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

8. An image recognition method by an image recognition apparatus, the method comprising:
a step of inputting a series image sequence having sequentiality;
a step of selecting a reference image from the series image sequence;
a step of selecting a proximity image that is close to the reference image from the series image sequence; and
an inference step of recognizing the reference image and the proximity image by performing inference processing on the reference image and the proximity image, the inference processing comprising convolution processing and activation function processing for outputting a constant value with respect to an input value within a predetermined region, wherein
in the inference step, results of performing the convolution processing and the activation function processing on the proximity image are generated from the results of the convolution processing and the activation function processing performed on the reference image, and the result of the product of the convolution processing performed on a difference image, which is an image of the difference between the reference image and the proximity image, and a derivative value of the results of the convolution processing and the activation function processing performed on the reference image.

\* \* \* \* \*